United States Patent
Xu et al.

(10) Patent No.: US 11,490,399 B2
(45) Date of Patent: Nov. 1, 2022

(54) SCHEDULING REQUEST CONFIGURATION METHOD AND SENDING METHOD, AND CORRESPONDING APPARATUS

(71) Applicant: Huawei Technologies Co., Ltd., Shenzhen (CN)

(72) Inventors: Haibo Xu, Beijing (CN); Xiao Xiao, Beijing (CN); Gaokun Pang, Shenzhen (CN); Jian Wang, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/651,947

(22) PCT Filed: May 10, 2018

(86) PCT No.: PCT/CN2018/086306
§ 371 (c)(1),
(2) Date: Mar. 27, 2020

(87) PCT Pub. No.: WO2019/062133
PCT Pub. Date: Apr. 4, 2019

(65) Prior Publication Data
US 2020/0314869 A1     Oct. 1, 2020

(30) Foreign Application Priority Data

Sep. 29, 2017 (CN) .......................... 201710911558.9

(51) Int. Cl.
*H04W 72/12* (2009.01)
*H04W 72/04* (2009.01)
*H04W 72/10* (2009.01)

(52) U.S. Cl.
CPC ....... *H04W 72/12* (2013.01); *H04W 72/0406* (2013.01); *H04W 72/10* (2013.01); *H04W 72/1205* (2013.01)

(58) Field of Classification Search
None
See application file for complete search history.

(56) References Cited

U.S. PATENT DOCUMENTS

| | | | |
|---|---|---|---|
| 2013/0235768 A1* | 9/2013 | Earnshaw | H04L 5/14 370/280 |
| 2013/0250828 A1 | 9/2013 | Chou et al. | |

(Continued)

FOREIGN PATENT DOCUMENTS

| | | |
|---|---|---|
| CN | 104170493 A | 11/2014 |
| CN | 104661316 A | 5/2015 |

(Continued)

OTHER PUBLICATIONS

"SR failure handling in NR," 3GPP TSG-RAN2 Meeting #99bis, R2-1710110, Prague, Czech Republic, Total 3 pages, 3rd Generation Partnership Project, Valbonne, France (Oct. 9-13, 2017).

(Continued)

*Primary Examiner* — Mohammad S Adhami
(74) *Attorney, Agent, or Firm* — Leydig, Voit & Mayer, Ltd.

(57) ABSTRACT

A scheduling request (SR) configuration method and sending method, and a corresponding apparatus are provided, to resolve a prior-art problem of a scheduling request configuration method and sending method, and a corresponding apparatus. The scheduling request configuration method includes: receiving, by a user equipment (UE), control signaling sent by a network device, where the control signaling is used to configure, for the UE, an SR configuration associated with at least one logical channel and at least two SR resource configurations associated with the SR (Continued)

configuration, and the SR resource configurations indicate physical resources used to signal an SR associated with the at least one logical channel; and signaling, by the UE based on a physical resource indicated by one of the at least two SR resource configurations, an SR associated with one of the at least one logical channel.

25 Claims, 12 Drawing Sheets

(56) References Cited

U.S. PATENT DOCUMENTS

| | | | |
|---|---|---|---|
| 2015/0146674 | A1 | 5/2015 | Krishnamurthy et al. |
| 2016/0366681 | A1 | 12/2016 | Dinan |
| 2017/0257876 | A1* | 9/2017 | Loehr ............... H04W 28/0278 |
| 2018/0014323 | A1 | 1/2018 | Huang et al. |
| 2018/0324872 | A1* | 11/2018 | Babaei ................ H04W 72/042 |
| 2019/0075585 | A1* | 3/2019 | Deogun ............ H04W 72/1273 |

FOREIGN PATENT DOCUMENTS

| | | |
|---|---|---|
| CN | 104904137 A | 9/2015 |
| CN | 110402608 A | 11/2019 |
| KR | 20120109590 A | 10/2012 |
| KR | 20140048272 A | 4/2014 |
| RU | 2447623 C2 | 4/2012 |
| RU | 2622111 C2 | 6/2017 |
| WO | 2015200799 A1 | 12/2015 |
| WO | 2016157808 A1 | 10/2016 |
| WO | 2017150828 A1 | 9/2017 |
| WO | 2018175547 A1 | 9/2018 |

OTHER PUBLICATIONS

Huawei, HiSilicon, "SR configuration and transmission for CA case in NR," 3GPP TSG-RAN2 Meeting #99bis Prague, Czech Republic, R2-1710111, total 4 pages, 3rd Generation Partnership Project, Valbonne, France (Oct. 9-13, 2017).

ASUSTeK, "Consideration on multiple SR configurations," 3GPP TSG-RAN WG2 Meeting NR Ad-hoc #2 Qingdao, China, R2-1706932, total 4 pages, 3rd Generation Partnership Project, Valbonne, France (Jun. 27-29, 2017).

ASUSTeK, "Consideration on multiple SR configurations," 3GPP TSG-RAN WG2 Meeting #99bis Prague, Czech Republic, R2-1711087 (Revision of R2-1709328), total 5 pages, 3rd Generation Partnership Project, Valbonne, France (Oct. 9-13, 2017).

"Multiple SR Configurations in NR," 3GPP TSG-RAN WG2 #99bis, Prague, Czech Republic, R2-1710658, pp. 1-3, 3rd Generation Partnership Project, Valbonne, France (Oct. 9-13, 2017).

"Presentation of Specification/Report to TSG: TS 38.321, Version 1.0.0," 3GPP TSG-RAN Meeting #77, Sapporo, Japan, RP-171733, one page, 3rd Generation Partnership Project, Valbonne, France (Sep. 11-14, 2017).

"3rd Generation Partnership Project; Technical Specification Group Radio Access Network; NR; Medium Access Control (MAC) protocol specification (Release 15)," 3GPP TS 38.321 V1.0.0, pp. 1-46, 3rd Generation Partnership Project, Valbonne, France (Sep. 2017).

"3rd Generation Partnership Project; Technical Specification Group Radio Access Network; NR; Radio Resource Control (RRC); Protocol specification (Release 15 )," 3GPP TS 38.331 V0.1.0, pp. 1-42, 3rd Generation Partnership Project, Valbonne, France (Oct. 2017).

Oppo, "SR configuration for BWP," 3GPP TSG RAN WG2 #99-Bis, Prague, Czech Republic, R2-1710130, total 3 pages, 3rd Generation Partnership Project, Valbonne, France (Oct. 9-13, 2017).

Samsung Electronics R&D Institute UK, "On LCH-to-SR-configuration mapping within the multi-BWP framework," 3GPP TSG-RAN WG2 #99-Bis, Prague, Czech Republic, R2-1710341, total 4 pages, 3rd Generation Partnership Project, Valbonne, France (Oct. 9-13, 2017).

MediaTek Inc., "SR/BSR design for multiple numerology," 3GPP TSG-RAM WG2 #98, Hangzhou, China, 3GPP Draft, R2-1704946, XP051264651, total 3 pages (May 6, 2017) (May 6, 2017).

MediaTek Inc., "SR/BSR design for multiple numerology," 3GPP TSG-RAN WG2 #98, Hangzhou, China, 3GPP Draft, R2-1704946, XP051264651, total 3 pages (May 15, 2017)-(May 19, 2017).

\* cited by examiner

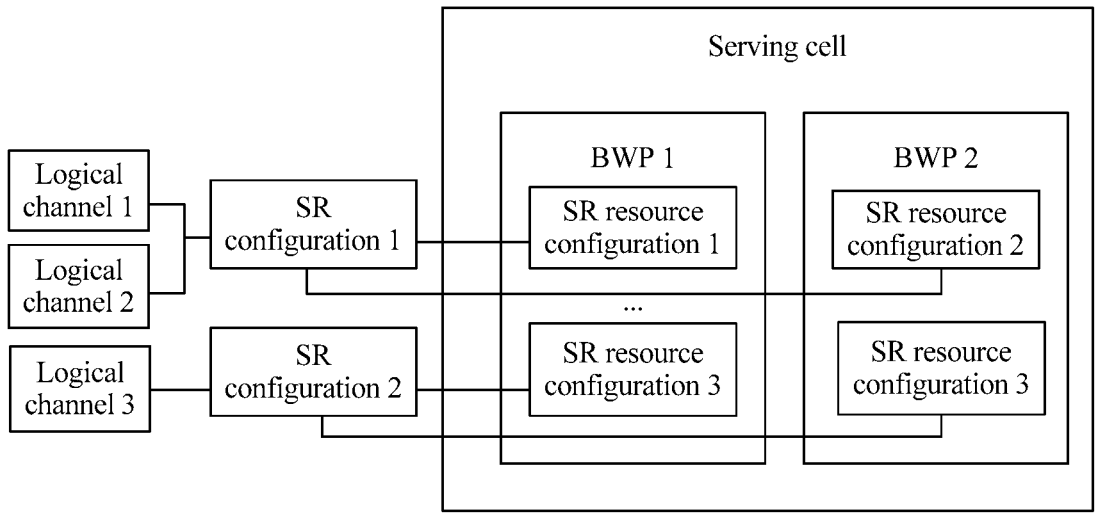
FIG. 4f
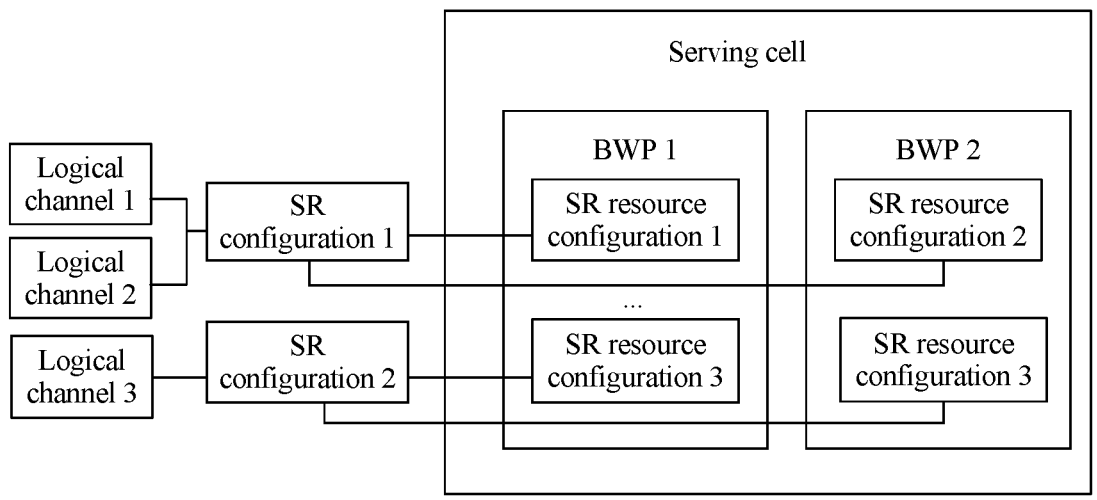
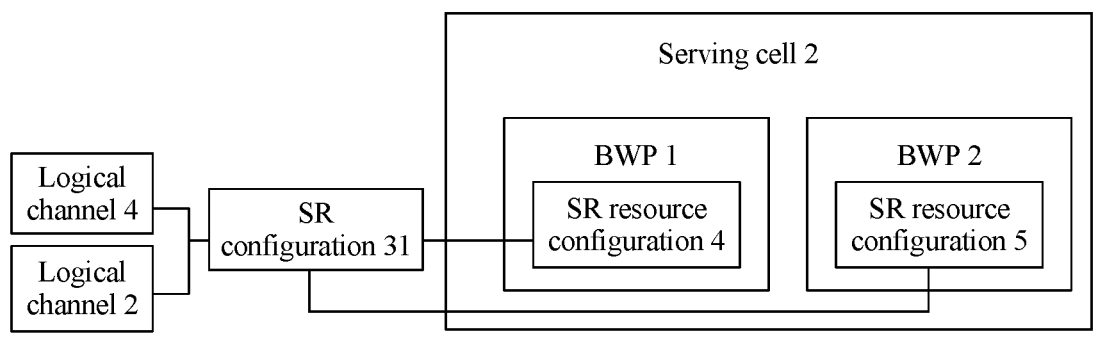
FIG. 4g

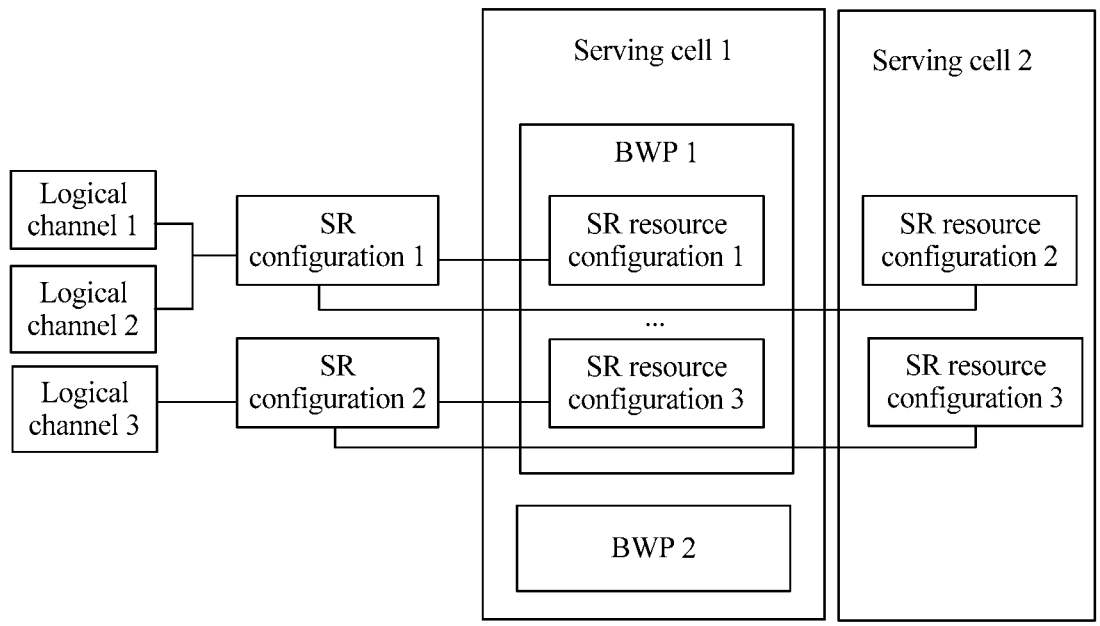

FIG. 4h

If an SR associated with a first logical channel in at least one logical channel is triggered and not canceled, UE determines that a first SR resource configuration in at least two SR resource configurations associated with the first logical channel is configured on an activated first BWP ╲ 21

For each time unit, if the user equipment has a physical resource indicated by the first SR resource configuration in the current time unit and an SR-prohibit timer that is set for an SR configuration does not run, the UE transmits, on the physical resource indicated by the first SR resource configuration, the SR associated with the first logical channel, and starts the SR-prohibit timer ╲ 22

FIG. 5

SCHEDULING REQUEST CONFIGURATION METHOD AND SENDING METHOD, AND CORRESPONDING APPARATUS

CROSS-REFERENCE TO RELATED APPLICATIONS

This application is a national stage of International Application No. PCT/CN2018/086306, filed on May 10, 2018, which claims priority to Chinese Patent Application No. 201710911558.9, filed on Sep. 29, 2017. Both of the aforementioned applications are hereby incorporated by reference in their entireties.

TECHNICAL FIELD

This application relates to the field of communications technologies, and in particular, to a scheduling request configuration method and sending method, and a corresponding apparatus.

BACKGROUND

In a 5th generation (5G) mobile communications system, a user equipment (UE) may have a plurality of services at the same time. Services having a same quality of service (QoS) requirement may be mapped to a same logical channel for transmission. Services having different QoS requirements may be mapped to different logical channels for transmission. During transmission, the services having the same QoS requirement need to be transmitted by using an uplink grant (UL grant) of a physical transmission parameter set (which may include a subcarrier spacing, a cyclic prefix length, a transmission time length, and the like) that can support the QoS requirement.

However, in the prior art, when allocating an uplink grant to the UE, a network device does not distinguish between transmission requirements of logical channels of the UE, and there is a lack of a mechanism for allocating, to a logical channel of the UE, an uplink grant matching a QoS requirement of the logical channel.

SUMMARY

This application provides a scheduling request configuration method and sending method, and a corresponding apparatus, to resolve a prior-art problem that there is a lack of a mechanism for allocating, to a logical channel of UE, an uplink grant matching a QoS requirement of the logical channel.

According to a first aspect, this application provides a scheduling request SR configuration method, including: receiving, by user equipment UE, control signaling sent by a network device, where the control signaling is used to configure, for the UE, an SR configuration associated with at least one logical channel and at least two SR resource configurations associated with the SR configuration, the at least one logical channel may be a plurality of logical channels having a same quality of service requirement, and the SR resource configurations indicate physical resources used to transmit an SR associated with the at least one logical channel. When the UE needs to send an SR associated with one of the at least one logical channel, the UE may transmit the SR based on a physical resource indicated by one of the at least two SR resource configurations.

In the foregoing technical solution, the UE may send, by using the physical resource indicated by the one of the at least two SR resource configurations associated with the logical channel of the UE, the SR associated with the logical channel. After receiving the SR sent by using the physical resource, the network device may determine a physical transmission parameter set mapped to a location of the physical resource. The physical transmission parameter set mapped to the location of the physical resource may include at least one of a subcarrier spacing, a cyclic prefix length, physical uplink shared channel (PUSCH) transmission duration, a time interval between control signaling for scheduling PUSCH transmission and time PUSCH transmission, and an available serving cell. Then, the UE allocates, to the UE, an uplink resource meeting the physical transmission parameter set, to meet the quality of service requirement of the logical channel. In addition, the at least one logical channel of the UE may be associated with the at least two SR resource configurations, so that when a physical resource indicated by one of the SR resource configurations is unavailable, the UE can transmit an SR by using a physical resource indicated by another associated SR resource configuration. Therefore, the UE can transmit the SR in a timelier manner, thereby reducing an SR transmission latency.

In some embodiments of the first aspect, the SR configuration includes SR-prohibit timer duration, the UE sets an SR-prohibit timer for the SR configuration, and starts the SR-prohibit timer after transmitting an SR on a physical resource indicated by any one of the at least two SR resource configurations, the SR-prohibit timer is configured to prohibit, during a running period of the SR-prohibit timer, the UE from transmitting an SR on a physical resource indicated by any one of the at least two SR resource configurations, and duration for which the SR-prohibit timer runs after being started each time is the SR-prohibit timer duration. In the foregoing technical solution, the UE sets the SR-prohibit timer for the SR configuration. This can avoid a transmission resource waste caused when an SR associated with a logical channel is resent only because the UE receives no uplink resource grant due to a normal transmission latency after the network device has normally responded to a previously sent SR, and can also prevent the network device from receiving a repeated SR.

In some embodiments of the first aspect, if an SR associated with a first logical channel in the at least one logical channel is triggered and not canceled, the UE determines the SR configuration associated with the first logical channel and a first SR resource configuration associated with the SR configuration on an activated first BWP; and for each time unit, if the user equipment has a physical resource indicated by the first SR resource configuration in the current time unit and the SR-prohibit timer that is set for the SR configuration does not run, the UE transmits, on the physical resource indicated by the first SR resource configuration, the SR associated with the first logical channel. In the foregoing technical solution, when at least two SR resource configurations associated with the first logical channel are configured on different BWPs, the UE sends the SR by using the physical resource indicated by the first SR resource configuration configured on the activated first BWP, to ensure that the UE can transmit the SR in a timely manner.

In some embodiments of the first aspect, after the UE transmits, on the physical resource indicated by the first SR resource configuration, the SR associated with the first logical channel, if a BWP activated by the user equipment changes from the first BWP to a second BWP and the SR associated with the first logical channel is not canceled, the user equipment determines a second SR resource configuration associated with the SR configuration on the activated second BWP; and for each time unit, if the user equipment has a physical resource indicated by the second SR resource configuration in the current time unit and the SR-prohibit timer that is set for the SR configuration does not run, the UE transmits, on the physical resource indicated by the second SR resource configuration, the SR associated with the first logical channel. In the foregoing technical solution, when the BWP activated by the UE changes and the SR associated with the first logical channel is not canceled, the UE may continue to send, on the activated second BWP after the change, the SR by using the physical resource indicated by the SR resource configuration associated with the first logical channel, so that the network device can allocate an uplink transmission resource to the first logical channel in a timely manner.

In some embodiments of the first aspect, if an SR associated with a first logical channel in the at least one logical channel is triggered and not canceled, the UE determines an SR configuration associated with the first logical channel, a third SR resource configuration associated with the SR configuration on an activated third BWP, and a fourth SR resource configuration associated with the SR configuration on an activated fourth BWP; and for each time unit, if the SR-prohibit timer that is set for the SR configuration does not run and the user equipment has a physical resource indicated by the third SR resource configuration or the fourth SR resource configuration in the current time unit, the UE transmits, on the physical resource, the SR associated with the first logical channel. In the foregoing technical solution, when the SR-prohibit timer does not run, the UE may transmit the SR by using a currently obtained physical resource for transmitting the SR associated with the first logical channel, and is not limited to transmitting the SR resource on a physical resource indicated by an SR resource configuration on a specific BWP. Therefore, utilization of a physical resource for transmitting the SR can be improved, and the SR can be transmitted in a timely manner, so that a time consumed by the UE to wait for an uplink resource grant is reduced.

In some embodiments of the first aspect, if an SR associated with a first logical channel in the at least one logical channel is triggered and not canceled, and none of BWPs on which at least two SR resource configurations associated with the first logical channel are configured is activated, the UE activates a first BWP on which a first SR resource configuration in the at least two SR resource configurations is configured; and for each time unit, if the user equipment has a physical resource indicated by the first SR resource configuration in the current time unit and the SR-prohibit timer that is set for the SR configuration does not run, the UE transmits, on the physical resource indicated by the first SR resource configuration, the SR associated with the first logical channel. In the foregoing technical solution, the UE may actively activate a BWP, namely, the first BWP, in a plurality of BWPs when the plurality of BWPs on which a physical resource for transmitting the SR associated with the first logical channel is configured are not activated, and the SR associated with the first logical channel needs to be sent, and send the SR by using the physical resource indicated by the SR resource configuration that is on the first BWP and that is associated with the first logical channel. Therefore, the SR is transmitted in a timely manner, so that a time consumed by the UE to wait for an uplink resource grant is reduced.

In some embodiments of the first aspect, before the UE activates the first BWP, the UE determines that an SR transmission occasion indicated by the first SR resource configuration is earlier than an SR transmission occasion indicated by any SR resource configuration other than the first SR resource configuration in the at least two SR resource configurations. In the foregoing technical solution, when none of the BWPs on which the at least two SR resource configurations associated with the first logical channel are configured is activated, the UE activates the first BWP on which the physical resource that can be earliest used to transmit the SR associated with the first logical channel is configured, to transmit the SR in a timely manner, thereby reducing a time consumed by the UE to wait for an uplink resource grant.

According to a second aspect, an embodiment of the present disclosure provides an SR transmission method, including: receiving, by UE, control signaling sent by a network device, where the control signaling is used to configure, for the UE, an SR configuration associated with the at least one logical channel and an SR resource configuration associated with the SR configuration; activating, by the UE, a first BWP if the UE has an SR that is associated with a first logical channel in the at least one logical channel and that is triggered and not canceled, the SR resource configuration is configured on the first BWP, and the first BWP is not activated; and transmitting, by the UE on a physical resource indicated by the SR resource configuration, the SR associated with the first logical channel. In the foregoing technical solution, the UE may actively activate the first BWP when the first BWP on which the physical resource for transmitting the SR associated with the first logical channel is configured is not activated, and the SR associated with the first logical channel needs to be sent, and send the SR by using the physical resource indicated by the SR resource configuration that is on the first BWP and that is associated with the first logical channel. Therefore, the SR is transmitted in a timely manner, so that a time consumed by the UE to wait for an uplink resource grant is reduced.

In some embodiments of the second aspect, all SR resource configurations of the UE are configured on the first BWP, so that the UE quickly locates a physical resource for transmitting an SR.

In some embodiments of the second aspect, SR resource configurations of the UE are configured on at least two BWPs of the UE, and serving cells that are of the UE and in which the at least two BWPs are located are a same serving cell or different serving cells. In the foregoing technical solution, the SR resource configurations of the UE may be configured on different BWPs, to avoid a problem that when a single BWP is unavailable, the UE cannot transmit an SR associated with any logical channel, thereby improving reliability.

In some embodiments of the first aspect or the second aspect, before the UE activates the first BWP, if a serving cell in which the first BWP is located is not activated, the UE activates the serving cell.

In some embodiments of the first aspect or the second aspect, that the UE activates the first BWP is specifically that the user equipment activates the first BWP and deactivates a second BWP activated before the first BWP is activated.

In some embodiments of the second aspect, the SR configuration includes SR-prohibit timer duration, the UE sets an SR-prohibit timer for the SR configuration, the SR-prohibit timer is configured to prohibit, during a running period of the SR-prohibit timer, the UE from transmitting an SR on the physical resource indicated by the SR resource configuration, duration for which the SR-prohibit timer runs after being started each time is the SR-prohibit timer duration, and the UE transmits, on the first BWP, the SR associated with the first logical channel, and starts the SR-prohibit timer.

In some embodiments of the first aspect or the second aspect, after transmitting, on the first BWP, the SR associated with the first logical channel, the UE returns to the second BWP on which the UE works before the first BWP is activated, to continue to perform a transmission task on the second BWP, thereby improving network resource utilization.

In some embodiments of the first aspect or the second aspect, after the UE returns to the second BWP activated before the first BWP is activated, the UE activates the first BWP if the SR is triggered and not canceled and the SR-prohibit timer does not run, and the UE transmits, on the first BWP, the SR associated with the first logical channel, and starts the SR-prohibit timer.

In some embodiments of the first aspect or the second aspect, an occasion on which the UE activates the first BWP is as follows: The SR associated with the first logical channel is triggered and not canceled, and the SR-prohibit timer does not run. Because the UE can send the SR associated with the first logical channel only when "the SR associated with the first logical channel is triggered and not canceled, and the SR-prohibit timer does not run", the UE activates the first BWP only when the condition is met, to avoid a situation in which the first BWP is activated excessively early, but the SR associated with the first logical channel cannot be sent on the first BWP, thereby reducing power consumption of the UE, and avoiding a network transmission resource waste.

In some embodiments of the first aspect or the second aspect, the user equipment deactivates the first BWP after transmitting the SR on the first BWP, thereby reducing power consumption of the UE.

In some embodiments of the first aspect or the second aspect, after the UE activates the first BWP, the user equipment may keep the first BWP being activated, until any one of the following conditions is met: control signaling sent by the network device for deactivating the first BWP is received; the UE can activate only one BWP in a same serving cell, and receives control signaling sent by the network device for activating another BWP in the serving cell in which the first BWP is located; a timer configured to control deactivation of the first BWP expires, where the timer may be started when no data or signaling is transmitted on the first BWP; the UE releases the physical resource that is on the first BWP, that is indicated by the SR resource configuration associated with the SR configuration, and that is used to transmit the SR; and the SR associated with the first logical channel is canceled. In the foregoing technical solution, after activating the first BWP, the UE may keep an activated state of the first BWP, so that when the SR associated with the first logical channel is not canceled and the SR-prohibit timer does not run, the UE may continue to send, on the first BWP, the SR associated with the first logical channel, to avoid activating the first BWP again after the first BWP is deactivated. In addition, when any one of the foregoing conditions is met, the UE can deactivate the first BWP, so that a network resource waste and power consumption of the UE are reduced, or normal running of a network is ensured.

According to a third aspect, this application provides a scheduling request SR configuration method, including: determining, by a network device, control signaling, where the control signaling is used to configure, for UE, an SR configuration associated with at least one logical channel and at least two SR resource configurations associated with the SR configuration, and the SR resource configurations indicate physical resources used to transmit an SR associated with the at least one logical channel; and sending, by the network device, the control signaling to the UE.

In some embodiments of the first aspect or the third aspect, the control signaling includes first control signaling and second control signaling, the first control signaling is used to configure, for the UE, the SR configuration associated with the at least one logical channel and a first part of SR resource configurations in the at least two SR resource configurations associated with the SR configuration, and the second control signaling is used to configure, for the UE, a second part of SR resource configurations in the at least two SR resource configurations associated with the SR configuration. In the foregoing technical solution, the network device may send a plurality of pieces of control signaling to the UE, and the UE updates, based on the plurality of pieces of control signaling, the SR resource configurations associated with the logical channel. With reference to a configuration manner 2, the network device may instruct, by using the control signaling, the UE to update the SR resource configurations associated with the SR configuration. Therefore, a manner of adjusting the SR resource configurations associated with the SR configuration is flexible, and efficiency is relatively high.

In some embodiments of the first aspect or the third aspect, the control signaling is further used to configure a configuration of the at least one logical channel for the UE, and a configuration of each logical channel in the configuration of the at least one logical channel includes a logical channel identifier. In the foregoing technical solution, the network device may configure, together for the UE, the logical channel, the SR configuration associated with the logical channel, and the SR resource configurations associated with the SR. Therefore, efficiency is relatively high.

In some embodiments of the first aspect or the third aspect, an implementation in which the at least one logical channel is associated with the SR configuration and the SR configuration is associated with the at least two SR resource configurations is as follows: any one of the at least two SR resource configurations includes an SR resource configuration identifier, the SR resource configuration identifiers included in the at least two SR resource configurations are the same, the configuration of the at least one logical channel includes the SR configuration identifier, and the SR configuration includes the SR resource configuration identifier. In the foregoing technical solution, the UE may determine, based on the SR configuration identifier included in the configuration of the logical channel, the SR configuration associated with the logical channel, and determine, based on the SR resource configuration identifier included in the SR configuration, the SR resource configuration associated with the SR configuration.

In some embodiments of the first aspect or the third aspect, an implementation in which the at least one logical channel is associated with the SR configuration and the SR configuration is associated with the at least two SR resource configurations is as follows: the configuration of the at least one logical channel includes the SR configuration identifier, and the SR resource configurations include the SR configuration identifier. In the foregoing technical solution, the UE may determine, based on the configuration of the logical channel, the SR configuration identifier of the SR configuration associated with the configuration of the logical channel, and then determine the at least two SR resource configurations including the SR configuration identifier.

In some embodiments of the first aspect or the third aspect, an implementation in which the at least one logical channel is associated with the SR configuration and the SR configuration is associated with the at least two SR resource configurations is as follows: the SR configuration includes a logical channel identifier of the at least one logical channel, and the SR resource configurations include the SR configuration identifier. In the foregoing technical solution, the UE may determine the SR configuration including the logical channel identifier, and determine the SR resource configurations including the SR configuration identifier of the SR configuration.

In some embodiments of the first aspect or the third aspect, an implementation in which the at least one logical channel is associated with the SR configuration and the SR configuration is associated with the at least two SR resource configurations is as follows: the SR resource configurations include SR resource configuration identifiers, and the SR resource configuration identifiers included in the at least two SR resource configurations are the same. The configuration of the at least one logical channel includes an identifier of the logical channel, an SR configuration identifier of the associated SR configuration, and the SR resource configuration identifiers of the SR resource configurations associated with the SR configuration. The SR configuration includes the SR configuration identifier. In the foregoing technical solution, the logical channel, the SR configuration, and the SR resource configurations can be efficiently associated.

In some embodiments of the first aspect or the third aspect, an implementation in which the at least one logical channel is associated with the SR configuration and the SR configuration is associated with the at least two SR resource configurations is as follows: the SR resource configurations include SR resource configuration identifiers, and the SR resource configuration identifiers included in the at least two SR resource configurations are the same. The SR configuration includes an SR configuration identifier, an identifier of the at least one associated logical channel, and the SR resource configuration identifiers. The configuration of the at least one logical channel includes the identifier of the logical channel. In the foregoing technical solution, the logical channel, the SR configuration, and the SR resource configurations can be efficiently associated.

In some embodiments of the first aspect or the third aspect, an implementation in which the at least one logical channel is associated with the SR configuration and the SR configuration is associated with the at least two SR resource configurations is as follows: the SR resource configurations include SR resource configuration identifiers, an identifier of the associated SR configuration, an identifier of the at least one logical channel, and SR resource configuration identifiers. The configuration of the at least one logical channel includes the identifier of the logical channel. The SR configuration includes the SR configuration identifier. In the foregoing technical solution, the logical channel, the SR configuration, and the SR resource configurations can be efficiently associated.

In some embodiments of the first aspect or the third aspect, an implementation in which the at least one logical channel is associated with the SR configuration and the SR configuration is associated with the at least two SR resource configurations is as follows: the SR resource configurations include SR resource configuration identifiers and an identifier of the at least one logical channel. The SR configuration includes the identifier of the at least one logical channel and an SR configuration identifier. The configuration of the at least one logical channel includes the identifier of the logical channel. In the foregoing technical solution, the logical channel, the SR configuration, and the SR resource configurations can be efficiently associated.

In some embodiments of the first aspect or the third aspect, an implementation in which the at least one logical channel is associated with the SR configuration and the SR configuration is associated with the at least two SR resource configurations is as follows: the SR resource configurations include SR resource configuration identifiers, and the SR resource configuration identifiers included in the at least two SR resource configurations are the same. The configuration of the at least one logical channel includes an identifier of the logical channel and the identifier of the associated SR resource configuration. The SR configuration includes an SR configuration identifier and the identifier of the associated SR resource configuration. In the foregoing technical solution, the logical channel, the SR configuration, and the SR resource configurations can be efficiently associated.

In some embodiments of the first aspect or the third aspect, the at least two SR resource configurations are respectively configured on different bandwidth parts BWPs, and any one of the SR resource configurations indicates a physical resource for transmitting an SR on a BWP on which the SR resource configuration is configured. In the foregoing technical solution, physical resources for transmitting an SR associated with a logical channel are configured on a plurality of BWPs of the UE, so that when one of the plurality of BWPs is not activated or the physical resource on the BWP is unavailable, an SR may be transmitted by using a physical resource indicated by the SR resource configuration configured on another BWP in the plurality of BWPs. Therefore, the UE can transmit the SR in a timelier manner, thereby reducing an SR transmission latency.

In some embodiments of the first aspect or the third aspect, all BWPs on which any one of the at least two SR resource configurations is configured belong to a same serving cell, or a first SR resource configuration in the at least two SR resource configurations is configured on a BWP of a first serving cell, and a second SR resource configuration in the at least two SR resource configurations is configured on a BWP of a second serving cell.

In some embodiments of the first aspect or the third aspect, the SR configuration includes a maximum quantity of SR transmission times, and the UE sets, for the SR configuration, a variable for recording a quantity of SR transmission times, adds one to a value of the variable after transmitting an SR on a physical resource indicated by any one of the at least two SR resource configurations, and after the value of the variable reaches the maximum quantity of SR transmission times, releases the physical resources indicated by the at least two SR resource configurations. In the foregoing technical solution, the variable is set for the SR configuration associated with the at least one logical channel. This facilitates unified management on transmission behavior of an SR associated with the logical channel, and improves efficiency of managing the transmission behavior of the SR associated with the logical channel.

In some embodiments of the third aspect, the SR configuration includes SR-prohibit timer duration, the UE sets an SR-prohibit timer for the SR configuration, and starts the SR-prohibit timer after transmitting an SR on a physical resource indicated by any one of the at least two SR resource configurations, the SR-prohibit timer is configured to prohibit, during a running period of the SR-prohibit timer, the UE from transmitting an SR on a physical resource indicated by any one of the at least two SR resource configurations, and duration for which the SR-prohibit timer runs after being started each time is the SR-prohibit timer duration. In the foregoing technical solution, the UE sets the SR-prohibit timer for the SR configuration. This can avoid a transmission resource waste caused when an SR associated with a logical channel is resent only because the UE receives no uplink resource grant due to a normal transmission latency after the network device has normally responded to a previously sent SR, and can also prevent the network device from receiving a repeated SR.

According to a fourth aspect, this application provides user equipment, and the user equipment is configured to perform the methods according to the first aspect, the second aspect, and any possible implementation of the first aspect and the second aspect. Specifically, the user equipment includes a module configured to perform the methods according to the first aspect, the second aspect, and any possible implementation of the first aspect and the second aspect.

Optionally, the user equipment includes: a memory, storing an instruction; a transceiver, configured to communicate with a network device; and a processor, separately communicating with and connected to the memory and the transceiver, and configured to execute the instruction in the memory, to perform the methods according to the first aspect, the second aspect, and any possible implementation of the first aspect and the second aspect.

According to a fifth aspect, this application provides a network device, and the network device is configured to perform the method according to the third aspect or any possible implementation of the third aspect. Specifically, the network device includes a module configured to perform the method according to the third aspect or any possible implementation of the third aspect.

Optionally, the network device includes: a memory, storing an instruction; a transceiver, configured to communicate with user equipment; and a processor, separately communicating with and connected to the memory and the transceiver, and configured to execute the instruction in the memory, to perform the method according to the third aspect or any possible implementation of the third aspect.

According to a sixth aspect, this application provides a computer readable storage medium. The readable storage medium stores a computer instruction. When the instruction is run on a computer, the computer is enabled to perform the methods according to the first aspect to the third aspect, and any possible implementation of the first aspect to the third aspect.

According to a seventh aspect, this application provides a computer program product. When the computer program product runs on a computer, the computer is enabled to perform the methods according to the first aspect to the third aspect, and any possible implementation of the first aspect to the third aspect.

According to an eighth aspect, this application provides a chip, including a processor and a memory. The memory is configured to store a computer program, and the processor is configured to invoke and run the computer program from the memory. The computer program is used to implement the methods according to the first aspect to the third aspect, and any possible implementation of the first aspect to the third aspect.

BRIEF DESCRIPTION OF DRAWINGS

FIG. 4a to FIG. 4h are schematic diagrams of a relationship between an SR resource configuration and a serving cell;

FIG. 5 to FIG. 9 are schematic flowcharts of an SR sending method according to an embodiment of the present disclosure.

DESCRIPTION OF EMBODIMENTS

Figure 1:
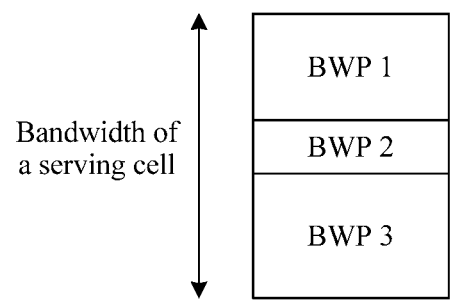
FIG. 1 is a schematic diagram of a bandwidth part BWP.

To make the objectives, technical solutions, and advantages of this application clearer, the following further describes this application in detail with reference to the accompanying drawings.

This application provides a scheduling request configuration method and sending method, and a corresponding apparatus, to resolve a prior-art problem that there is a lack of a mechanism for allocating, to a logical channel of UE, an uplink grant matching a QoS requirement of the logical channel. The method and the apparatus are based on a same inventive concept. Because principles of the method and the apparatus for resolving a problem are similar, mutual reference may be made between implementation of the apparatus and implementation of the method, and repeated descriptions are omitted.

"A plurality of" mentioned in this application means "two or more". In addition, it should be understood that in the description of this application, the words "first", "second", and the like are merely used for distinction description, and shall not be understood as an indication or implication of relative importance or an indication or implication of an order. "Association" between A and B may be understood as a mapping established between A and B in some embodiments. The mapping may be a bidirectional mapping between A and B, may be a mapping from A to B, or may be a mapping from B to A.

The following describes some concepts related to the embodiments of the present disclosure.

User equipment UE may be a device that provides a user with voice and/or data connectivity, a handheld device with a wireless connection function, or another processing device connected to a wireless modem. Wireless user equipment may communicate with one or more core networks by using a radio access network (RAN). The wireless user equipment may be a mobile terminal such as a mobile phone (or referred to as a "cellular" phone) or a computer having a mobile terminal. For example, the wireless user equipment may be a portable, pocket-sized, handheld, computer built-in, or in-vehicle mobile apparatus that exchanges language and/or data with the radio access network. For example, the wireless user equipment may be a device such as a personal communications service (PCS) phone, a cordless telephone set, a session initiation protocol (SIP) phone, a wireless local loop (WLL) station, or a personal digital assistant (PDA). The wireless user equipment may also be referred to as a system, a subscriber unit, a subscriber station, a mobile station, a mobile console, a remote station, an access point, a remote terminal, an access terminal, a user terminal, or a user agent.

A network device may be a base station. The base station may be a gNodeB (gNode B, gNB) in 5G communication, an evolved NodeB (evolutional Node B, eNB, or e-NodeB) in LTE, a base transceiver station (BTS) in GSM or CDMA, a NodeB in wideband code division multiple access (Wideband CDMA, WCDMA), or the like. The following content in the embodiments of the present disclosure uses the base station as an example for description.

A bandwidth part (BWP) is as follows: Referring to FIG. 1, to enable UE having a lowest bandwidth capability in all UEs to work on a broadband carrier, the broadband carrier is divided into a plurality of small bandwidth parts, and each bandwidth part is referred to as a BWP.

A scheduling request (SR) configuration is associated with a logical channel, and is used to indicate a physical resource for sending an SR associated with the logical channel. In the embodiments of the present disclosure, a concept of the SR configuration may have the following cases: (1) The SR configuration includes an identifier of the SR configuration, an SR-prohibit timer, and a maximum quantity of SR transmission times, and also includes a parameter used to determine a location of a physical resource used to transmit an SR. In this case, one logical channel is associated with/mapped to at least one SR configuration. (2) The SR configuration includes an identifier of the SR configuration, an SR-prohibit timer, and a maximum quantity of SR transmission times, but includes no parameter used to determine a location of a physical resource used to transmit an SR. A parameter used to determine a location of a physical resource used to transmit an SR is included in another SR-related configuration. For example, the SR-related configuration may be an SR resource configuration. In this case, one logical channel is associated with/mapped to at least one SR configuration, and one SR configuration is associated with/mapped to at least one SR resource configuration.

An SR resource configuration is as follows: A configuration that specifically includes a parameter used to determine a location of a physical resource used to transmit an SR is referred to as the SR resource configuration.

Figure 2:
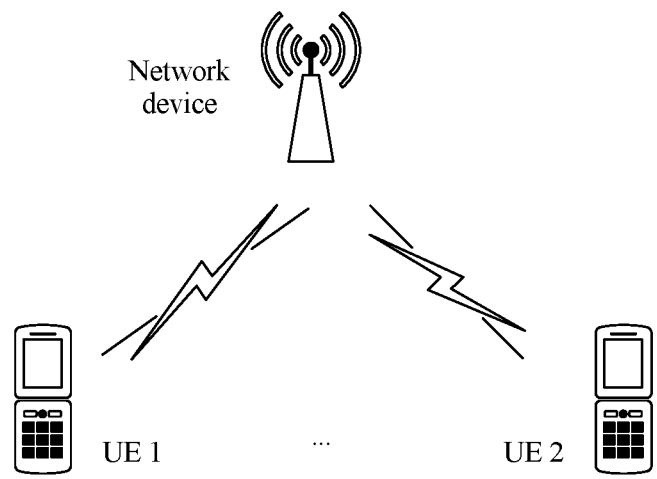
FIG. 2 is a schematic diagram of a communications system according to an embodiment of the present disclosure.
Figure 3:
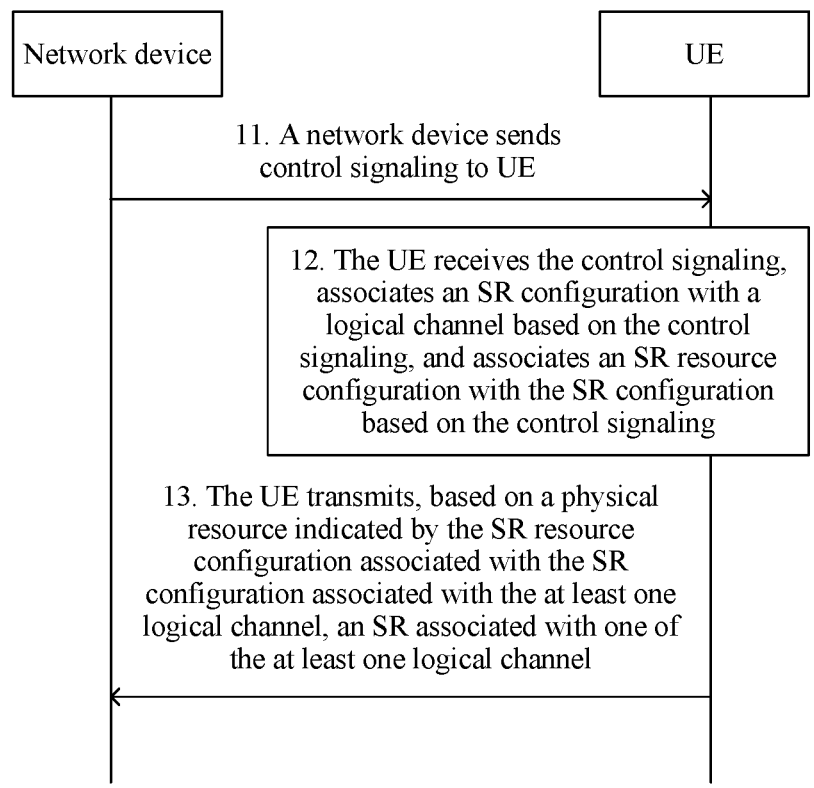
FIG. 3 is a schematic flowchart of an SR configuration method according to an embodiment of the present disclosure.

FIG. 2 is a schematic diagram of a communications system according to an embodiment of the present disclosure. The communications system includes a network device and a plurality of UEs. With reference to the communications system shown in FIG. 1, an embodiment of the present disclosure provides an SR configuration method. Referring to FIG. 3, the method includes the following steps.

Step 11: The network device sends control signaling to UE, where the control signaling is used to configure, for the UE, an SR configuration associated with at least one logical channel; and an SR resource configuration associated with the SR configuration.

In this embodiment of the present disclosure, the SR configuration associated with the at least one logical channel and the SR resource configuration associated with the SR configuration may include the following implementations:

In a configuration manner 1, at least one logical channel is associated with one SR configuration, and the SR configuration is associated with one SR resource configuration.

In a configuration manner 2, at least one logical channel is associated with one SR configuration, and the SR configuration is associated with at least two SR resource configurations.

In a configuration manner 3, at least one logical channel is associated with at least two SR configurations, and each SR configuration is associated with one SR resource configuration. When the at least one logical channel is two or more logical channels, each of the two or more logical channels is associated with the at least two SR configurations. In other words, a physical resource indicated by the SR resource configuration associated with each SR configuration may be used to transmit an SR associated with any one of the at least one logical channel.

To facilitate description, for the configuration manner 1, in the following content of this embodiment of the present disclosure, an "SR resource configuration associated with an SR configuration associated with a logical channel" is referred to as an "SR resource configuration associated with a logical channel" for short. For the configuration manner 2 and the configuration manner 3, in the following content of this embodiment of the present disclosure, "at least two SR resource configurations associated with an SR configuration associated with a logical channel" and a "set of SR resource configurations associated with each of at least two SR configurations associated with a logical channel" are referred to as "at least two SR resource configurations associated with a logical channel" for short.

When the at least one logical channel is two or more logical channels, the two or more logical channels may have a same QoS requirement. A same SR resource configuration is associated with the two or more logical channels, so that the UE transmits, based on a physical resource indicated by the SR resource configuration associated with the two or more logical channels, an SR associated with one of the two or more logical channels. When receiving the SR, the network device may determine, based on a location of the physical resource for transmitting the SR, a logical channel to which the SR resource configuration corresponding to the location of the physical resource is mapped, and then allocate, to the UE based on a mapping relationship between the logical channel and a physical transmission parameter set, an uplink transmission resource meeting the physical transmission parameter set, so that the uplink transmission resource can meet the QoS requirement of the at least one logical channel of the UE. The physical transmission parameter set may include at least one of a subcarrier spacing, a cyclic prefix length, physical uplink shared channel (PUSCH) transmission duration, a time interval between control signaling for scheduling PUSCH transmission and a PUSCH transmission resource, and an available serving cell.

In a communications network, the UE may be configured in only one of the foregoing three configuration manners. Alternatively, in a communications network, any two or all of the foregoing three configuration manners may be implemented at the same time, and the network device may select a proper configuration manner based on different types/communication requirements of UEs. For example, the configuration manner 2 may be used for a mobile terminal, and at least two SR resource configurations are configured for a logical channel of the mobile terminal, so that when a physical resource indicated by one of the at least two SR resource configurations is unavailable or has relatively poor transmission quality because the mobile terminal moves, the mobile terminal can transmit an SR based on a physical resource indicated by another SR resource configuration configured for the logical channel. Therefore, the mobile terminal can transmit the SR in a timely manner. For another example, a smart home device usually does not move, and therefore one SR resource configuration may be configured for the smart home device in the configuration manner 1, to save a physical resource for transmitting an SR.

Step 12: The UE receives the control signaling, associates the SR configuration with the logical channel based on the control signaling, and associates the SR resource configuration with the SR configuration based on the control signaling. In some implementations, the UE may store the SR configuration (file) and the SR resource configuration (file), and a configuration (file) of the logical channel may include an identifier/a parameter pointing to the SR configuration associated with the logical channel, or the SR configuration (file) may include an identifier/a parameter pointing to the at least one logical channel associated with the SR configuration. Likewise, the SR configuration (file) includes an identifier/a parameter pointing to the SR resource configuration associated with the SR configuration, or the SR resource configuration (file) includes an identifier/a parameter pointing to the SR configuration associated with the SR resource configuration. In some other embodiments, the UE may create or update, based on the control signaling, a list of physical resources for transmitting an SR of the logical channel. Table 1 is a possible instance of the list.

TABLE 1

| Logical channel | SR configuration | SR resource configuration |
| --- | --- | --- |
| LCH 1 and LCH 2 | SR configuration 1 | SR resource configurations 1 and 2 |
| LCH 3 | SR configuration 2 | SR resource configuration 3 |
| LCH 4 and LCH 5 | SR configuration 3 | SR resource configuration 4 |
|  | SR configuration 4 | SR resource configuration 5 |
| ... | ... | ... |

In Table 1, the second row corresponds to the configuration manner 2, the third row corresponds to the configuration manner 1, and the fourth row corresponds to the configuration manner 3.

Step 13: The UE transmits, based on a physical resource indicated by the SR resource configuration associated with the SR configuration associated with the at least one logical channel, an SR associated with one of the at least one logical channel.

When the configuration manner 2 is implemented, for a logical channel of the UE, the UE transmits, based on a physical resource indicated by one of at least two SR resource configurations associated with an SR configuration associated with the logical channel, an SR associated with the logical channel. When the configuration manner 3 is implemented, for a logical channel of the UE, the UE transmits, based on a physical resource indicated by an SR resource configuration associated with one of at least two SR configurations associated with the logical channel, an SR associated with the logical channel.

In a technical solution corresponding to the configuration manner 1, a plurality of logical channels of the UE that have a same QoS requirement may be associated with a same SR configuration, so that when receiving an SR transmitted based on a physical resource indicated by the SR configuration, the network device allocates an uplink transmission resource matching a location of the physical resource, to meet the QoS requirement of the logical channels. In a technical solution corresponding to the configuration manner 2 or the configuration manner 3, the at least one logical channel may be associated with at least two SR resource configurations, so that when a physical resource indicated by one of the SR resource configurations is unavailable, the UE can transmit an SR by using a physical resource indicated by another associated SR resource configuration. Therefore, the UE can transmit the SR in a timelier manner, thereby reducing an SR transmission latency. In addition, when the foregoing plurality of configuration manners are implemented in a same network, for requirements of different UEs, a physical resource for transmitting an SR associated with a logical channel can be flexibly configured for the UEs, thereby improving network resource utilization.

In an optional manner, with reference to the configuration manner 2 or 3, the network device may send a plurality of pieces of control signaling to associate at least two SR resource configurations with the at least one logical channel.

For example, with reference to the configuration manner 2, in step 12, the control signaling includes first control signaling and second control signaling, and the UE receives the first control signaling sent by the network device. The first control signaling is used to configure, for the UE, the SR configuration associated with the at least one logical channel and a first part of SR resource configurations associated with the SR configuration. The first part of SR resource configurations may be one or more SR resource configurations. Then, the UE receives the second control signaling sent by the network device. The second control signaling is used to configure, for the UE, a second part of SR resource configurations associated with the SR configuration. The second part of SR resource configurations may be one or more SR resource configurations. In some embodiments, in response to the second control signaling, the UE adds the second part of SR resource configurations to the SR resource configuration associated with the SR configuration. In other words, the UE associates both the first part of SR resource configurations and the second part of SR resource configurations with the SR configuration. In some other embodiments, in response to the second control signaling, the UE replaces the first part of SR resource configurations and an associated SR resource configuration with the second part of SR resource configurations. In other words, the UE cancels an association between the first part of SR resource configurations and the SR configuration, and associates the second part of SR resource configurations with the SR configuration.

For another example, with reference to the configuration manner 3, in step 12, the control signaling includes third control signaling and fourth control signaling, and the UE receives the third control signaling sent by the network device. The third control signaling is used to configure, for the UE, a first part of SR configurations associated with the at least one logical channel and an SR resource configuration associated with each of the first part of SR configurations. The first part of SR configurations may be one or more SR configurations. Then, the UE receives second control signaling sent by the network device. The second control signaling is used to configure, for the UE, a second part of SR configurations associated with the at least one logical channel and an SR resource configuration associated with each of the second part of SR configurations. The second part of SR configurations may be one or more SR configurations.

In the foregoing technical solution, the network device may send the plurality of pieces of control signaling to the UE, and the UE updates, based on the plurality of pieces of control signaling, the SR resource configurations associated with the logical channel. With reference to the configuration manner 2, the network device may instruct, by using the control signaling, the UE to update the SR resource configurations associated with the SR configuration. Therefore, a manner of adjusting the SR resource configurations associated with the SR configuration is flexible, and efficiency is relatively high.

In an optional manner, in step 12, the control signaling may further be used to configure a configuration of the at least one logical channel for the UE. In this technical solution, the network device may configure, together for the UE, the logical channel, the SR configuration associated with the logical channel, and the SR resource configuration associated with the SR. Therefore, efficiency is relatively high.

In this embodiment of the present disclosure, that the at least one logical channel is associated with the SR configuration and the SR configuration is associated with the SR resource configuration may have a plurality of implementations, including but not limited to the following manners.

In an association manner 1, the SR resource configuration includes an SR resource configuration identifier, the configuration of the at least one logical channel includes an identifier of the logical channel and an SR configuration identifier of the associated SR configuration, and the SR configuration includes the SR configuration identifier and the SR resource configuration identifier of the associated SR resource configuration.

With reference to the configuration manner 2, any one of the at least two SR resource configurations includes an SR resource configuration identifier, the SR resource configuration identifiers included in the at least two SR resource configurations are the same, the configuration of the at least one logical channel includes the SR configuration identifier, and the SR configuration includes the SR resource configuration identifier.

In the association manner 1, the UE may determine, based on the SR configuration identifier included in the configuration of the logical channel, the SR configuration associated with the logical channel, and determine, based on the SR resource configuration identifier included in the SR configuration, the SR resource configuration associated with the SR configuration.

In an association manner 2, the SR configuration includes an SR configuration identifier, the configuration of the at least one logical channel includes the SR configuration identifier of the associated SR configuration, and the SR resource configuration includes the SR configuration identifier of the associated SR configuration.

With reference to the configuration manner 2, the SR configuration includes an SR configuration identifier, the configuration of the at least one logical channel includes the SR configuration identifier of the associated SR configuration, and the at least two SR resource configurations all include the SR configuration identifier.

In the association manner 2, the UE may determine, based on the configuration of the logical channel, the SR configuration identifier of the SR configuration associated with the configuration of the logical channel, and then determine the at least two SR resource configurations including the SR configuration identifier.

In an association manner 3, the configuration of the at least one logical channel includes an identifier of the logical channel. The SR configuration includes an identifier of the SR configuration and the logical channel identifier of the at least one logical channel, and the SR resource configuration includes the SR configuration identifier. With reference to the configuration manner 2, SR configuration identifiers included in the at least two SR resource configurations associated with the SR configuration are the same, and are an identifier of the SR configuration.

In the association manner 3, the UE may determine the SR configuration including the logical channel identifier, and determine the SR resource configuration including the SR configuration identifier of the SR configuration.

In an association manner 4, the SR resource configuration includes an SR resource configuration identifier, and the SR resource configuration identifiers included in the at least two SR resource configurations are the same. The configuration of the at least one logical channel includes an identifier of the logical channel, an SR configuration identifier of the associated SR configuration, and the SR resource configuration identifiers of the SR resource configurations associated with the SR configuration. The SR configuration includes the SR configuration identifier.

In an association manner 5, the SR resource configuration includes an SR resource configuration identifier, and the SR resource configuration identifiers included in the at least two SR resource configurations are the same. The SR configuration includes an SR configuration identifier, an identifier of the at least one associated logical channel, and the SR resource configuration identifiers. The configuration of the at least one logical channel includes the identifier of the logical channel.

In an association manner 6, the SR resource configuration includes an SR resource configuration identifier, an identifier of the associated SR configuration, an identifier of the at least one logical channel, and an SR resource configuration identifier. The configuration of the at least one logical channel includes the identifier of the logical channel. The SR configuration includes the SR configuration identifier.

In an association manner 7, the SR resource configuration includes an SR resource configuration identifier and an identifier of the at least one logical channel. The SR configuration includes the identifier of the at least one logical channel and an SR configuration identifier. The configuration of the at least one logical channel includes the identifier of the logical channel.

In an association manner 8, the SR resource configuration includes an SR resource configuration identifier, and the SR resource configuration identifiers included in the at least two SR resource configurations are the same. The configuration of the at least one logical channel includes an identifier of the logical channel and the identifier of the associated SR resource configuration. The SR configuration includes an SR configuration identifier and the identifier of the associated SR resource configuration.

In this embodiment of the present disclosure, a BWP is configured in a serving cell, and the SR resource configuration may be configured on the BWP, in other words, the physical resource indicated by the SR resource configuration is located on the BWP. There may be a plurality of types of correspondences between an SR resource configuration associated with a logical channel and a BWP configured by the network device for the UE, including the following correspondences.

Figure 4A:
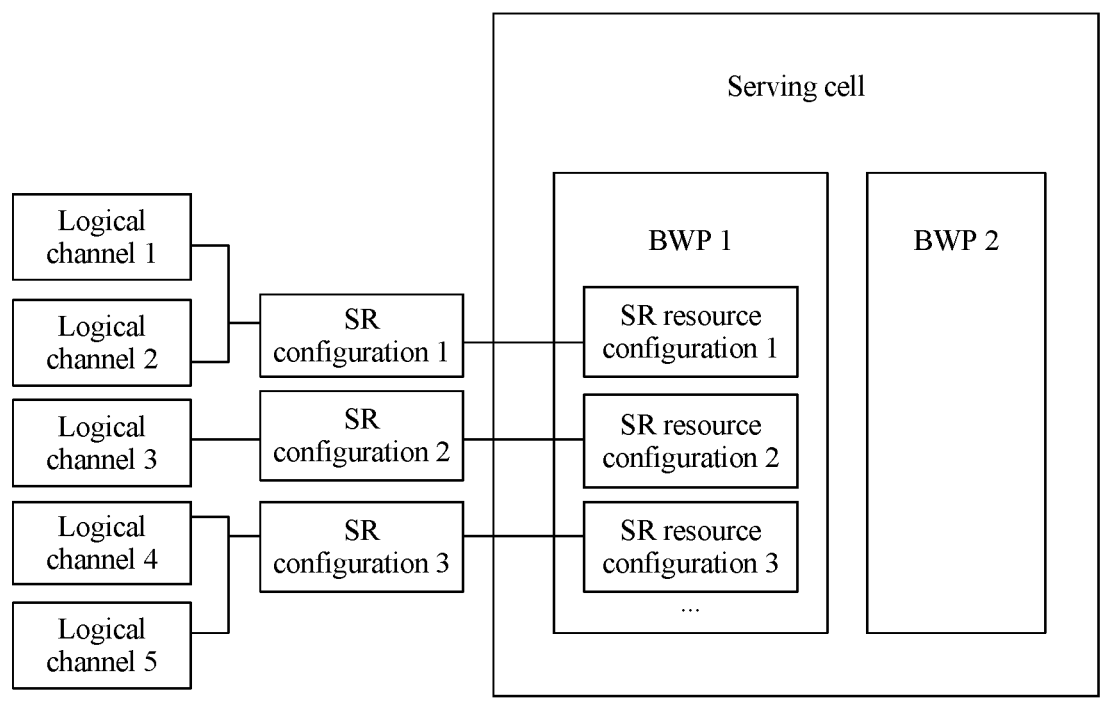
Figure 4B:
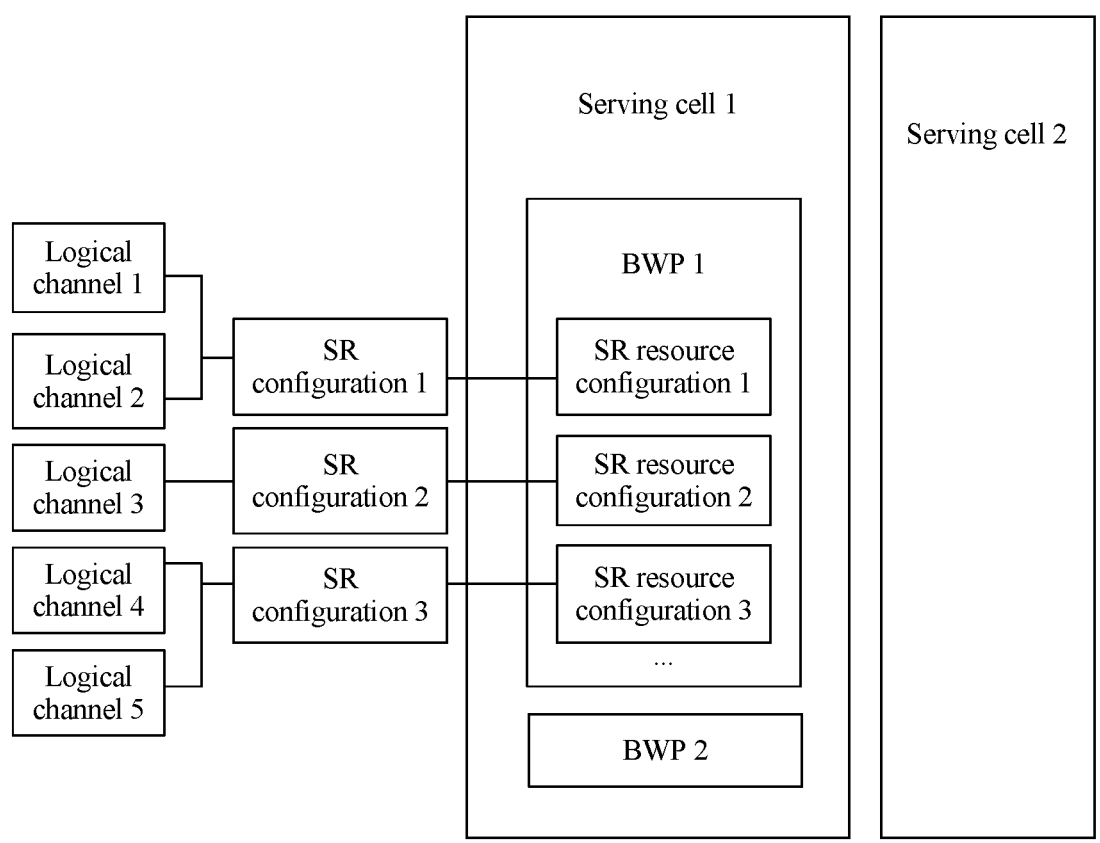

In a correspondence 1, for the configuration manner 1, all SR resource configurations of the UE are configured on a same BWP, to be specific, physical resources for transmitting an SR associated with any logical channel of the UE are all located on the BWP. The BWP may be a default BWP of the UE. For example, referring to FIG. 4*a*, the network device allocates one serving cell to the UE, a plurality of BWPs are configured in the serving cell, and all the SR resource configurations of the UE are configured on one BWP of the serving cell. For another example, referring to FIG. 4b, the network device allocates a plurality of serving cells to the UE, and all the SR resource configurations of the UE are configured on one BWP of one of the serving cells. The serving cell may have a plurality of BWPs. Alternatively, the serving cell has only one BWP, and the BWP corresponds to all bandwidth of the serving cell. The latter case may also be understood as follows: All the SR resource configurations of the UE are configured on one serving cell, and no BWP is configured in the serving cell.

In a solution of the correspondence 1, all the SR resource configurations of the UE are configured on one BWP, so that the UE quickly locates a physical resource for transmitting an SR.

Figure 4C:
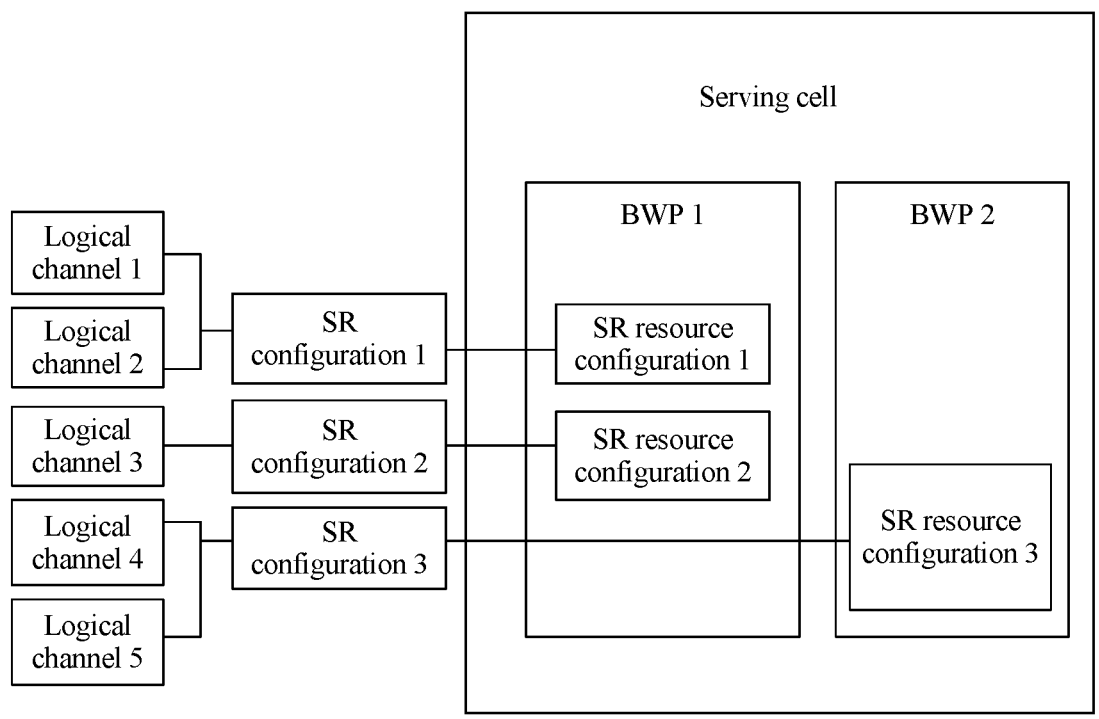
Figure 4D:
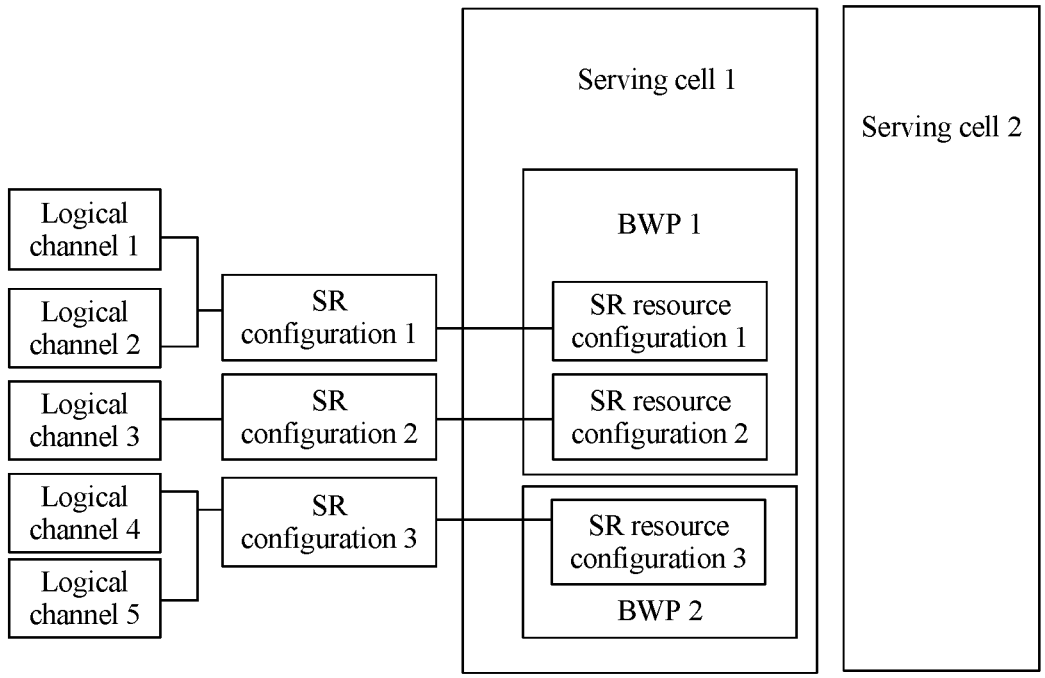
Figure 4E:
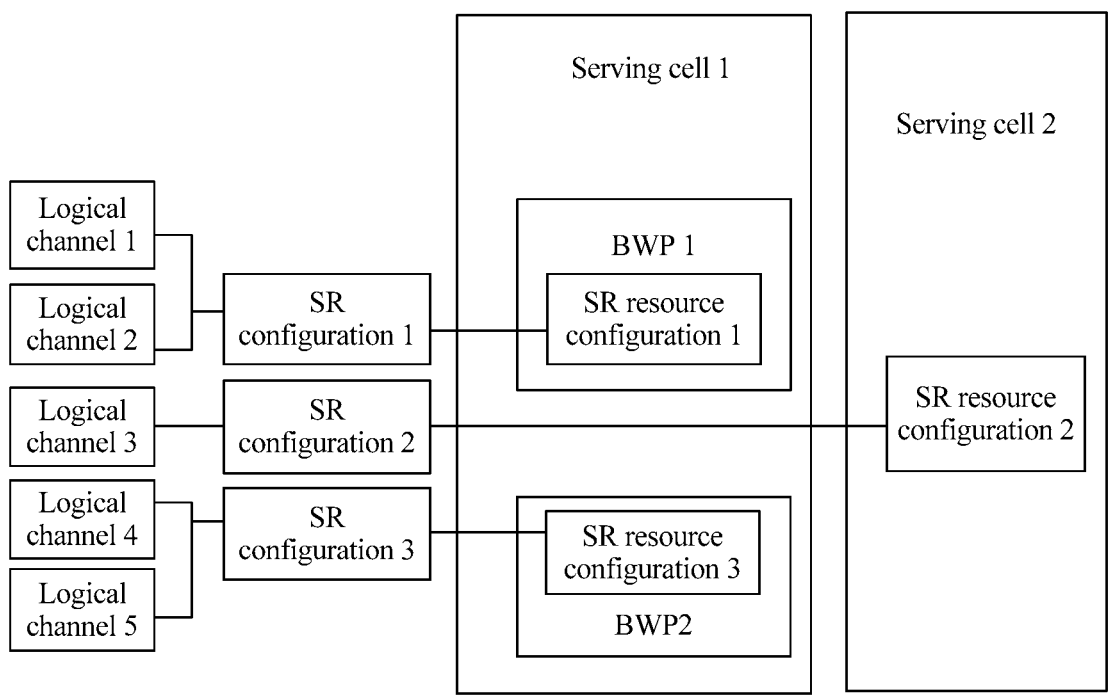

In a correspondence 2, for the configuration manner 1, SR resource configurations of the UE are configured on at least two BWPs of the UE. This may include the following cases: (1) Referring to FIG. 4c, the network device allocates one serving cell to the UE, a plurality of BWPs are configured in the serving cell, and SR resource configurations are configured on at least two BWPs. (2) Referring to FIG. 4d, the network device allocates a plurality of serving cells to the UE, an SR resource configuration is configured in only one of the serving cells, and SR resource configurations are configured on at least two BWPs of the serving cell. (3) Referring to FIG. 4e, the network device allocates a plurality of serving cells to the UE, the BWPs are configured in at least two serving cells, only one BWP may be configured or a plurality of BWPs may be configured in one of the at least two serving cells (or no BWP division is performed in the serving cell, such as a serving cell 2), and an SR resource configuration may be configured on one or more of the plurality of BWPs.

In a solution of the correspondence 2, the SR resource configurations of the UE may be configured on different BWPs, to avoid a problem that when a single BWP is unavailable, the UE cannot transmit an SR associated with any logical channel, thereby improving reliability.

In a correspondence 3, for the configuration manner 2 or the configuration manner 3, the at least two SR resource configurations associated with the at least one logical channel are respectively configured on different BWPs, and each SR resource configuration indicates a physical resource for transmitting an SR on a BWP on which the SR resource configuration is configured. Optionally, referring to FIG. 4f (one serving cell is allocated to the UE) and FIG. 4g (a plurality of serving cells are allocated to the UE), a plurality of BWPs on which the at least two SR resource configurations are configured may belong to a same serving cell. Alternatively, referring to FIG. 4h, the network device allocates two serving cells to the UE, a logical channel 1 and a logical channel 2 are associated with an SR configuration 1, the SR configuration 1 is associated with an SR resource configuration 1 and an SR resource configuration 2, the SR resource configuration 1 is configured on a BWP 1 of a serving cell 1, and the SR resource configuration 2 is configured in a serving cell 2 (no BWP division is performed in the serving cell 2).

In a solution of the correspondence 3, physical resources for transmitting an SR associated with a logical channel are configured on a plurality of BWPs of the UE, so that when one of the plurality of BWPs is not activated or the physical resource on the BWP is unavailable, an SR may be transmitted by using a physical resource indicated by the SR resource configuration configured on another BWP in the plurality of BWPs. Therefore, the UE can transmit the SR in a timelier manner, thereby reducing an SR transmission latency.

In a correspondence 4, with reference to the correspondence 3, one of the at least two SR resource configurations is configured on each BWP allocated by the network device to the UE. The correspondence may also be described as follows: The network device allocates N BWPs to the UE, the network device configures N associated SR resource configurations for the at least one logical channel, the N SR resource configurations are respectively configured on the N BWPs, and one SR resource configuration is configured on each BWP.

In a solution of the correspondence 4, when working on any BWP, the UE may transmit an SR by using a physical resource indicated by an SR resource configuration on the BWP on which the UE currently works, so that reliability is improved, and the SR can be transmitted in a timely manner.

Optionally, in the correspondences 1 to 4, a serving cell to which a BWP on which an SR resource configuration is configured belongs is a serving cell in which a physical uplink control channel is configured.

In an optional manner, with reference to the configuration manner 2, in step 12, the SR configuration configured for the UE by using the control signaling includes a maximum quantity of SR transmission times. The UE sets, for the SR configuration based on the maximum quantity of SR transmission times, a variable for recording a quantity of SR transmission times, adds one to a value of the variable after transmitting an SR on a physical resource indicated by any one of the at least two SR resource configurations, and after the value of the variable reaches the maximum quantity of SR transmission times, releases physical resources indicated by the at least two SR resource configurations associated with the SR configuration.

In the foregoing technical solution, the variable is set for the SR configuration associated with the at least one logical channel. This facilitates unified management on transmission behavior of an SR associated with the logical channel, and improves efficiency of managing the transmission behavior of the SR associated with the logical channel.

In an optional manner, with reference to the configuration manner 3, in step 12, all SR configurations configured for the UE by using the control signaling include a same maximum quantity of SR transmission times. The UE sets, for each SR configuration based on the maximum quantity of SR transmission times, a variable for recording a quantity of SR transmission times, to record a quantity of times of SR transmission on a physical resource indicated by an SR resource configuration associated with the SR configuration. After transmitting an SR on a physical resource indicated by an SR resource configuration associated with an SR configuration, the UE adds one to a value of a variable that is set for the SR configuration, and after the value of the variable reaches the maximum quantity of SR transmission times, releases the physical resource indicated by the SR resource configuration associated with the SR configuration.

In the foregoing technical solution, different variables are set for different SR configurations. This facilitates precise management on SR transmission behavior on a physical resource indicated by each SR resource configuration.

In an optional manner, with reference to the configuration manner 3, in step 12, each SR configuration configured for the UE by using the control signaling includes an independent maximum quantity of SR transmission times. The UE sets, for a corresponding SR configuration in the plurality of SR configurations based on the maximum quantity of SR transmission times, a variable for recording a quantity of SR transmission times, to record a quantity of times of SR transmission on a physical resource indicated by an SR resource configuration associated with the SR configuration. After transmitting an SR on a physical resource indicated by an SR resource configuration associated with an SR configuration, the UE adds one to a value of a variable that is set for the SR configuration, and after the value of the variable reaches the maximum quantity of SR transmission times, releases the physical resource indicated by the SR resource configuration associated with the SR configuration.

In the foregoing technical solution, different variables are set for different SR configurations. This facilitates precise management on SR transmission behavior on a physical resource indicated by each SR resource configuration.

In an optional manner, with reference to the configuration manner 1 or the configuration manner 2, the SR configuration configured for the UE by using the control signaling includes SR-prohibit timer duration. The UE sets an SR-prohibit timer for the SR configuration based on the SR-prohibit timer duration, and starts the SR-prohibit timer after transmitting an SR on a physical resource indicated by an SR resource configuration associated with the SR configuration. The SR-prohibit timer is configured to prohibit, during a running period of the SR-prohibit timer, the UE from transmitting an SR on the physical resource indicated by the SR resource configuration associated with the SR configuration, and duration for which the SR-prohibit timer runs after being started each time is the SR-prohibit timer duration. With reference to the configuration manner 2, the UE starts the SR-prohibit timer after transmitting an SR on a physical resource indicated by any one of the at least two SR resource configurations. The SR-prohibit timer is configured to prohibit, during the running period of the SR-prohibit timer, the UE from transmitting an SR on a physical resource indicated by any one of the at least two SR resource configurations.

In the foregoing technical solution, the UE sets the SR-prohibit timer for the SR configuration. This can avoid a transmission resource waste caused when an SR associated with a logical channel is resent only because the UE receives no uplink resource grant due to a normal transmission latency after the network device has normally responded to a previously sent SR, and can also prevent the network device from receiving a repeated SR.

In an optional manner, with reference to the configuration manner 3, a plurality of SR configurations associated with the at least one logical channel of the UE include same SR-prohibit timer duration, or only one of the SR configurations includes SR-prohibit timer duration, or the plurality of SR configurations include no SR-prohibit timer duration, but include an identifier of an SR configuration group. The control signaling is further used to associate the SR configuration group with the at least one logical channel, and the SR configuration group includes the SR-prohibit timer duration. The UE sets an SR-prohibit timer for the plurality of SR configurations based on the SR-prohibit timer duration, and starts the SR-prohibit timer after transmitting an SR on a physical resource indicated by an SR resource configuration associated with any one of the plurality of SR configurations. The SR-prohibit timer is configured to prohibit, during a running period of the SR-prohibit timer, the UE from transmitting an SR on a physical resource indicated by an SR resource configuration associated with any one of the plurality of SR configurations, and duration for which the SR-prohibit timer runs after being started each time is the SR-prohibit timer duration.

In the foregoing technical solution, the UE sets the same SR-prohibit timer for the plurality of SR configurations associated with the at least one logical channel. This can avoid a transmission resource waste caused when an SR associated with a logical channel is resent only because the UE receives no uplink resource grant due to a normal transmission latency after the network device has normally responded to a previously sent SR, and can also prevent the network device from receiving a repeated SR.

In an optional manner, with reference to the configuration manner 3, a plurality of SR configurations associated with the at least one logical channel of the UE include same SR-prohibit timer duration, or only one of the SR configurations includes SR-prohibit timer duration, or the plurality of SR configurations include no SR-prohibit timer duration, but include an identifier of an SR configuration group. The control signaling is further used to associate the SR configuration group with the at least one logical channel, and the SR configuration group includes the SR-prohibit timer duration. The UE sets an SR-prohibit timer for each of the plurality of SR configurations based on the SR-prohibit timer duration, and starts the SR-prohibit timer after transmitting an SR on a physical resource indicated by an SR resource configuration associated with the SR configuration. The SR-prohibit timer is configured to prohibit, during a running period of the SR-prohibit timer, the UE from transmitting an SR on the physical resource indicated by the SR resource configuration associated with the SR configuration, and duration for which the SR-prohibit timer runs after being started each time is the SR-prohibit timer duration.

In the foregoing technical solution, the UE sets the independent SR-prohibit timer for each of the plurality of SR configurations associated with the at least one logical channel, so that when sending an SR on the physical resource indicated by the SR resource configuration associated with each SR configuration, the UE may not be affected by behavior of sending an SR on a physical resource indicated by an SR resource configuration associated with another SR configuration.

In an optional manner, with reference to the configuration manner 3, a plurality of SR configurations associated with the at least one logical channel of the UE include independent SR-prohibit timer duration. The UE sets an SR-prohibit timer for each corresponding SR configuration in the plurality of SR configurations based on the SR-prohibit timer duration, and starts the SR-prohibit timer after transmitting an SR on a physical resource indicated by an SR resource configuration associated with the SR configuration. The SR-prohibit timer is configured to prohibit, during a running period of the SR-prohibit timer, the UE from transmitting an SR on the physical resource indicated by the SR resource configuration associated with the SR configuration, and duration for which the SR-prohibit timer runs after being started each time is the SR-prohibit timer duration.

In the foregoing technical solution, the UE sets the independent SR-prohibit timer for each of the plurality of SR configurations associated with the at least one logical channel, so that when sending an SR on the physical resource indicated by the SR resource configuration associated with each SR configuration, the UE may not be affected by behavior of sending an SR on a physical resource indicated by an SR resource configuration associated with another SR configuration.

The following continues to describe several possible implementations of a method used by the UE to send an SR.

In an implementation 1, with reference to the configuration manner 2 or the configuration manner 3, referring to FIG. 5, that the UE sends an SR includes the following steps.

Step 21: If an SR associated with a first logical channel in the at least one logical channel is triggered and not canceled, the UE determines that a first SR resource configuration in at least two SR resource configurations associated with the first logical channel is configured on an activated first BWP.

With reference to the configuration manner 2, a process in which the UE determines that a first SR resource configuration in at least two SR resource configurations associated with the first logical channel is configured on an activated first BWP may be as follows: The UE determines that the first logical channel is associated with the SR configuration, determines that SR resource configurations associated with the SR configuration are the at least two SR resource configurations, and determines that the first SR resource configuration in the at least two SR resource configurations is configured on the activated first BWP.

With reference to the configuration manner 3, a process in which the UE determines that a first SR resource configuration in at least two SR resource configurations associated with the first logical channel is configured on an activated first BWP may be as follows: The UE determines that the first logical channel is associated with the at least two SR configurations, determines SR resource configurations respectively associated with the at least two SR configurations, and determines that the first SR resource configuration associated with a first SR configuration in the at least two SR configurations is configured on the activated first BWP.

Step 22: For each time unit, if the user equipment has a physical resource indicated by the first SR resource configuration in the current time unit and an SR-prohibit timer that is set for the SR configuration does not run, the UE transmits, on the physical resource indicated by the first SR resource configuration, the SR associated with the first logical channel, and starts the SR-prohibit timer.

In the foregoing technical solution, when the at least two SR resource configurations associated with the first logical channel are configured on different BWPs, the UE sends the SR by using the physical resource indicated by the first SR resource configuration configured on the activated first BWP, to ensure that the UE can transmit the SR in a timely manner.

Figure 6:
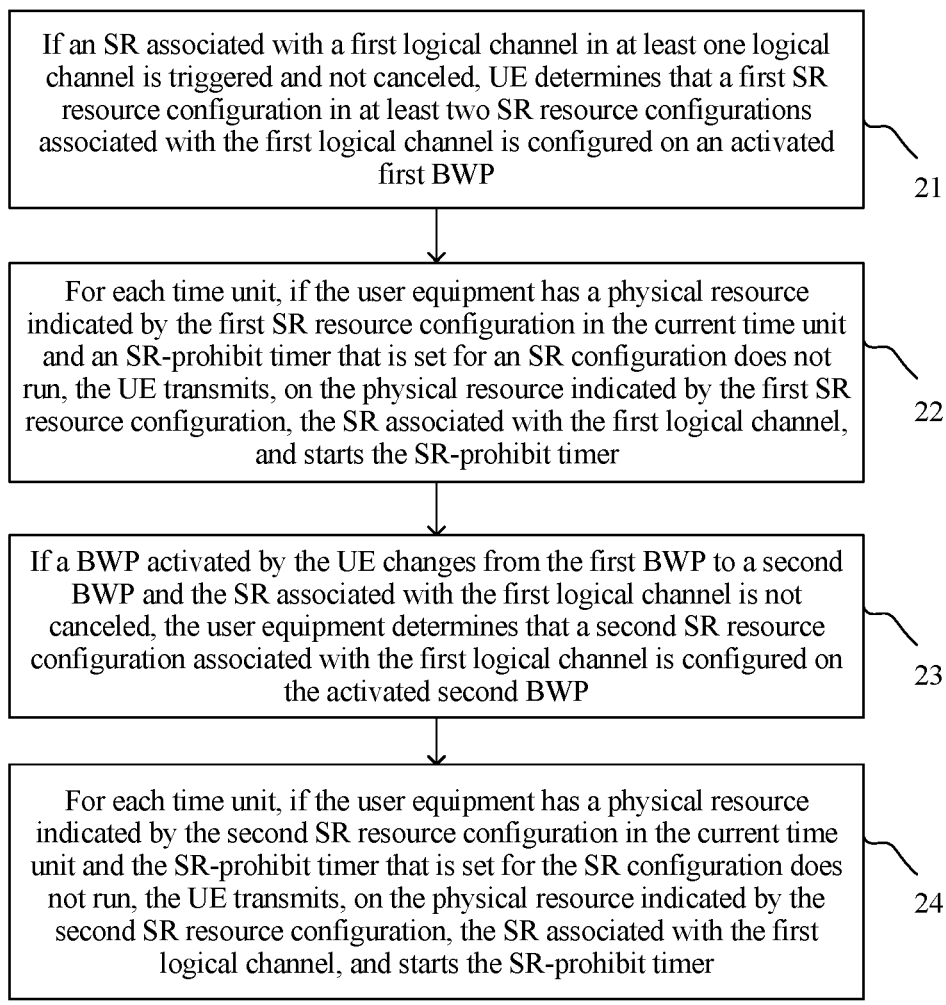

Optionally, with reference to the implementation 1, referring to FIG. 6, after step 22, the method further includes the following steps.

Step 23: If a BWP activated by the UE changes from the first BWP to a second BWP and the SR associated with the first logical channel is not canceled, the user equipment determines that a second SR resource configuration associated with the first logical channel is configured on the activated second BWP. In some embodiments, the UE may change the activated BWP from the first BWP to the second BWP according to an instruction of the network device. In some other embodiments, the UE may autonomously change the activated BWP from the first BWP to the second BWP. For example, when the physical resource indicated by the first SR resource configuration on the first BWP has been released, the UE may change the activated BWP from the first BWP to the second BWP.

Step 24: For each time unit, if the user equipment has a physical resource indicated by the second SR resource configuration in the current time unit and the SR-prohibit timer that is set for the SR configuration does not run, the UE transmits, on the physical resource indicated by the second SR resource configuration, the SR associated with the first logical channel, and starts the SR-prohibit timer.

In the foregoing technical solution, when the BWP activated by the UE changes and the SR associated with the first logical channel is not canceled, the UE may continue to send, on the activated second BWP after the change, the SR by using the physical resource indicated by the SR resource configuration associated with the first logical channel, so that the network device can allocate an uplink transmission resource to the first logical channel in a timely manner.

Optionally, in the implementation 1, the UE can activate only one BWP. Alternatively, the UE can activate only one BWP in one serving cell, but can activate two or more serving cells at the same time. Alternatively, the UE can activate two or more BWPs in one serving cell.

Figure 7:
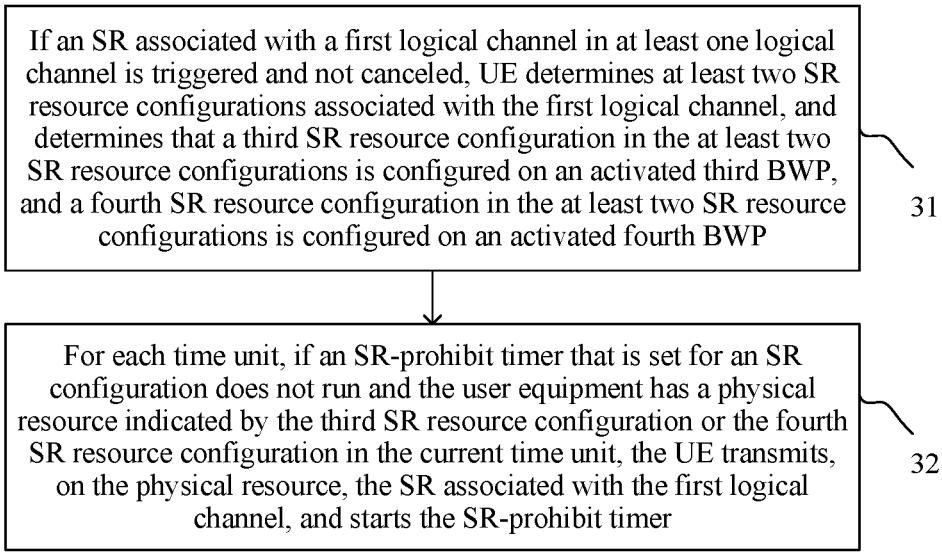

In an implementation 2, with reference to the configuration manner 2 or the configuration manner 3, referring to FIG. 7, that the UE sends an SR includes the following steps.

Step 31: If an SR associated with a first logical channel in the at least one logical channel is triggered and not canceled, the UE determines at least two SR resource configurations associated with the first logical channel, and determines that a third SR resource configuration in the at least two SR resource configurations is configured on an activated third BWP, and a fourth SR resource configuration in the at least two SR resource configurations is configured on an activated fourth BWP. For an implementation in which "the UE determines at least two SR resource configurations associated with the first logical channel" in the configuration manner 2 or the configuration manner 3, refer to the description in step 21.

Step 32: For each time unit, if an SR-prohibit timer that is set for the SR configuration does not run and the user equipment has a physical resource indicated by the third SR resource configuration or the fourth SR resource configuration in the current time unit, the UE transmits, on the physical resource, the SR associated with the first logical channel, and starts the SR-prohibit timer.

A possible implementation process of step 32 is as follows: The UE sends, by using the physical resource indicated by the third resource configuration, the SR associated with the first logical channel, and starts the SR-prohibit timer. After the SR-prohibit timer expires, if the SR associated with the first logical channel is not canceled, and the UE has no physical resource indicated by the third SR resource configuration, but has the physical resource indicated by the fourth SR resource configuration, the UE may send the SR by using the physical resource indicated by the fourth SR resource configuration, and start the timer.

In the foregoing technical solution, when the SR-prohibit timer does not run, the UE may transmit the SR by using a currently obtained physical resource for transmitting the SR associated with the first logical channel, and is not limited to transmitting the SR resource on a physical resource indicated by an SR resource configuration on a specific BWP. Therefore, utilization of a physical resource for transmitting the SR can be improved, and the SR can be transmitted in a timely manner, so that a time consumed by the UE to wait for an uplink resource grant is reduced.

Figure 8:
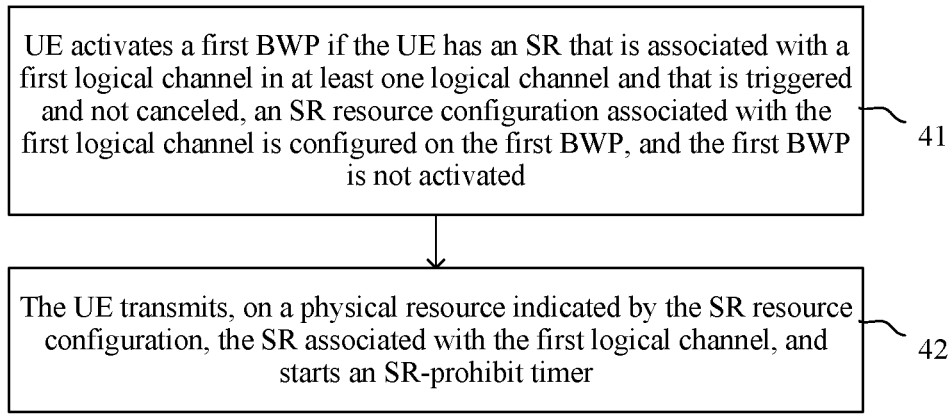

In an implementation 3, with reference to the configuration manner 1, referring to FIG. 8, that the UE sends an SR includes the following steps.

Step 41: The UE activates a first BWP if the UE has an SR that is associated with a first logical channel in the at least one logical channel and that is triggered and not canceled, the SR resource configuration associated with the first logical channel is configured on the first BWP, and the first BWP is not activated.

Step 42: The UE transmits, on a physical resource indicated by the SR resource configuration, the SR associated with the first logical channel, and starts an SR-prohibit timer.

In the foregoing technical solution, the UE may actively activate the first BWP when the first BWP on which the physical resource for transmitting the SR associated with the first logical channel is configured is not activated, and the SR associated with the first logical channel needs to be sent, and send the SR by using the physical resource indicated by the SR resource configuration that is on the first BWP and that is associated with the first logical channel. Therefore, the SR is transmitted in a timely manner, so that a time consumed by the UE to wait for an uplink resource grant is reduced.

Figure 9:
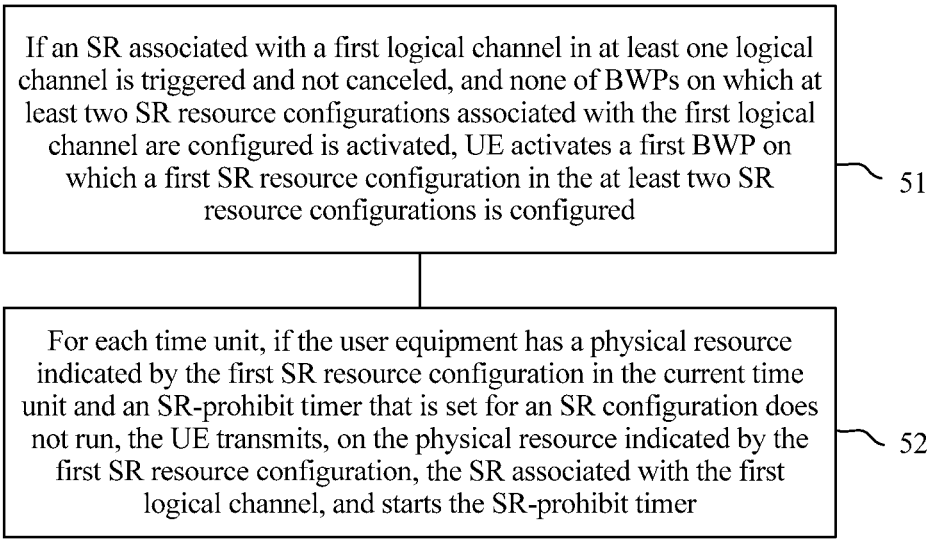

In an implementation 4, with reference to the configuration manner 2 or the configuration manner 3, referring to FIG. 9, that the UE sends an SR includes the following steps.

Step 51: If an SR associated with a first logical channel in the at least one logical channel is triggered and not canceled, and none of BWPs on which at least two SR resource configurations associated with the first logical channel are configured is activated, the UE activates a first BWP on which a first SR resource configuration in the at least two SR resource configurations is configured.

Step 52: For each time unit, if the user equipment has a physical resource indicated by the first SR resource configuration in the current time unit and an SR-prohibit timer that is set for the SR configuration does not run, the UE transmits, on the physical resource indicated by the first SR resource configuration, the SR associated with the first logical channel, and starts the SR-prohibit timer.

In the foregoing technical solution, the UE may actively activate a BWP, namely, the first BWP, in a plurality of BWPs when the plurality of BWPs on which a physical resource for transmitting the SR associated with the first logical channel is configured are not activated, and the SR associated with the first logical channel needs to be sent, and send the SR by using the physical resource indicated by the SR resource configuration that is on the first BWP and that is associated with the first logical channel. Therefore, the SR is transmitted in a timely manner, so that a time consumed by the UE to wait for an uplink resource grant is reduced.

Optionally, with reference to the implementation 4, the UE may determine, in the following manner, which one of a plurality of logical channels on which an SR resource configuration associated with the first logical channel is configured is to be activated, and details are as follows: If the UE determines that an SR transmission occasion indicated by the first SR resource configuration configured on the first BWP is earlier than an SR transmission occasion indicated by any SR resource configuration other than the first SR resource configuration in the at least two SR resource configurations, the UE determines to activate the first BWP.

In the foregoing technical solution, when none of the BWPs on which the at least two SR resource configurations associated with the first logical channel are configured is activated, the UE activates the first BWP on which the physical resource that can be earliest used to transmit the SR associated with the first logical channel is configured, to transmit the SR in a timely manner, thereby reducing a time consumed by the UE to wait for an uplink resource grant.

Optionally, with reference to the implementation 3 or the implementation 4, before the UE activates the first BWP, if a serving cell in which the first BWP is located is not activated, the UE activates the serving cell, so that the UE can further activate the first BWP. In some embodiments, the serving cell to which the first BWP belongs and the first BWP are simultaneously activated. The embodiments of the present disclosure are intended to protect this solution.

Optionally, with reference to the implementation 3 or the implementation 4, after the UE activates the first BWP, the user equipment may keep the first BWP being activated, until any one of the following conditions is met:

a. control signaling sent by the network device for deactivating the first BWP is received;

b. the UE can activate only one BWP in a same serving cell, and receives control signaling sent by the network device for activating another BWP in the serving cell in which the first BWP is located;

c. a timer configured to control deactivation of the first BWP expires, where the timer may be started when no data or signaling is transmitted on the first BWP;

d. the UE releases the physical resource that is on the first BWP, that is indicated by the SR resource configuration associated with the SR configuration, and that is used to transmit the SR; and e. the SR associated with the first logical channel is canceled.

In the foregoing technical solution, after activating the first BWP, the UE may keep an activated state of the first BWP, so that when the SR associated with the first logical channel is not canceled and the SR-prohibit timer does not run, the UE may continue to send, on the first BWP, the SR associated with the first logical channel, to avoid activating the first BWP again after the first BWP is deactivated. In addition, when any one of the foregoing conditions is met, the UE can deactivate the first BWP, so that a network resource waste and power consumption of the UE are reduced, or normal running of a network is ensured.

Optionally, with reference to the implementation 3 or the implementation 4, when activating the first BWP, the UE deactivates a second BWP activated before the first BWP is activated. In some variant solutions, the UE first deactivates the second BWP, and then activates the first BWP. In some other variant solutions, the UE first activates the first BWP, and then deactivates the second BWP. The embodiments of the present disclosure are intended to protect these variations.

Optionally, with reference to the implementation 3 or the implementation 4, after transmitting, on the first BWP, the SR associated with the first logical channel, the UE returns to the second BWP on which the UE works before the first BWP is activated. A purpose for which the UE works on the first BWP is to transmit the SR associated with the first logical channel. After the SR is sent on the first BWP, the SR-prohibit timer is started. Because the UE needs to continue to send data and/or receive data on the second BWP, the UE returns to the second BWP on which the UE previously works, to continue to perform a transmission task on the second BWP, thereby improving network resource utilization.

Optionally, with reference to the implementation 3 or the implementation 4, after transmitting, on the first BWP, the SR associated with the first logical channel, the UE deactivates the first BWP. A purpose for which the UE works on the first BWP is to transmit the SR associated with the first logical channel. After the SR is sent on the first BWP, the SR-prohibit timer is started. Because the UE has no transmission task on the first BWP, the UE may deactivate the first BWP, thereby reducing power consumption of the UE.

Optionally, with reference to the implementation 3 or the implementation 4, after transmitting, on the first BWP, the SR associated with the first logical channel, the UE deactivates the first BWP, and returns to the second BWP on which the UE works before the first BWP is activated, to improve network resource utilization and reduce power consumption of the UE.

Optionally, with reference to the implementation 3 or the implementation 4, an occasion on which the UE activates the first BWP is as follows: The SR associated with the first logical channel is triggered and not canceled, and the SR-prohibit timer does not run. Because the UE can send the SR associated with the first logical channel only when "the SR associated with the first logical channel is triggered and not canceled, and the SR-prohibit timer does not run", the UE activates the first BWP only when the condition is met, to avoid a situation in which the first BWP is activated excessively early, but the SR associated with the first logical channel cannot be sent on the first BWP, thereby reducing power consumption of the UE, and avoiding a network transmission resource waste.

It should be noted that, when there is no conflict, a plurality of optional implementations of the implementation 3 or the implementation 4 may be combined. For example, when the SR associated with the first logical channel is triggered and not canceled, and the SR-prohibit timer does not run, the UE activates the first BWP, and starts the SR-prohibit timer after transmitting, on the first BWP, the SR associated with the first logical channel. Then, the UE deactivates the first BWP, and returns to the second BWP on which the UE previously works. If the SR associated with the first logical channel is triggered and not canceled when the SR-prohibit timer stops running, the UE re-activates the first BWP, and after transmitting, on the first BWP, the SR associated with the first logical channel, starts the SR-prohibit timer and returns to the second BWP. In the foregoing manner, the SR can be transmitted in a timely manner, a network transmission resource can be effectively used, and power consumption of the UE can be reduced.

Optionally, in this embodiment of the present disclosure, the SR associated with the first logical channel includes:

an SR triggered by a regular buffer status report BSR triggered because new data reaches the first logical channel; and/or an SR triggered by a regular BSR triggered because a BSR retransmission timer expires, where the first logical channel is a logical channel with a highest priority in all current second logical channels of the terminal device, and the second logical channels are logical channels having available transmission data or logical channels having available transmission data and belonging to one logical channel group; and/or a BSR triggered because a BSR retransmission timer expires, where the first logical channel is a logical channel that is in all current second logical channels of the terminal device and of which a value of either of the following two parameters in an associated transmission parameter set is smallest. The parameters include:

a parameter 1: a time length of uplink resource transmission; and a parameter 2: a length of a time interval between control signaling for scheduling an uplink resource and the scheduled uplink resource.

The second logical channels are logical channels having available transmission data or logical channels having available transmission data and belonging to one logical channel group.

Parameters in the transmission parameter set may include but are not limited to at least one of the following items: a subcarrier spacing, a cyclic prefix length, a time length of uplink resource transmission, a length of a time interval between control signaling for scheduling an uplink resource and the scheduled uplink resource transmission, and a serving cell of a terminal device corresponding to an uplink resource.

Optionally, in this embodiment of the present disclosure, in the several possible implementations in which the UE sends an SR, when the UE determines whether the SR associated with the first logical channel can be transmitted in a time unit, in addition to the following conditions: (1) there is a physical resource that can be used to transmit the SR in the current time unit, and (2) the SR-prohibit timer does not run, the following condition further needs to be met: (3) the current time unit is not a part of a measurement gap.

Optionally, in this embodiment of the present disclosure, the time unit may be implemented in a plurality of manners. The following describes the time unit in detail by using specific examples. Certainly, the time unit in this embodiment may include but is not limited to the following implementations.

In a first implementation, the time unit is a default/predefined time length. For example, the time length may be a time length that is of one slot and that includes a symbol length corresponding to a reference subcarrier spacing. For example, the reference subcarrier spacing may be a subcarrier spacing of 15 KHz.

In a second implementation, the time unit is a transmission time length corresponding to an uplink resource received by the UE. Different subcarrier spacings may be used for different uplink resources. Therefore, corresponding symbol lengths may be different. In addition, different uplink resources may occupy different quantities of symbols. Therefore, the UE receives uplink resources with different transmission lengths.

In a third implementation, the time unit is a transmission time length corresponding to downlink control signaling for scheduling an uplink resource of the UE. Different subcarrier spacings may be used for different downlink control signaling. Therefore, corresponding symbol lengths may be different. In addition, different downlink control signaling may occupy different quantities of symbols during transmission. Therefore, the UE receives downlink control signaling with different transmission lengths.

In a fourth implementation, the time unit is a default/predefined time length including a symbol length corresponding to a subcarrier spacing in a transmission parameter set that can be used by or that is mapped to the first logical channel. For example, the time unit may be a time length that is of one slot and that includes the symbol length corresponding to the subcarrier spacing.

In a fifth implementation, the time unit is a time length determined based on a symbol length corresponding to a subcarrier spacing in a transmission parameter set that can be used by or that is mapped to the first logical channel, and a default quantity of symbols occupied by data transmission on the logical channel.

In a sixth implementation, the time unit is a symbol length corresponding to a subcarrier spacing in a transmission parameter that can be used by or that is mapped to the first logical channel.

In a seventh implementation, the time unit is a default/predefined time length including a symbol length corresponding to a subcarrier spacing that is used by a physical resource for transmitting an SR and that is configured in an SR configuration mapped to/associated with the first logical channel.

In an eighth implementation, the time unit is a time length determined based on a symbol length corresponding to a subcarrier spacing that is used by a physical resource for transmitting an SR and that is configured in an SR configuration mapped to/associated with the first logical channel, and a quantity of occupied symbols.

In a ninth implementation, the time unit is a symbol length corresponding to a subcarrier spacing that is used by a physical resource for transmitting an SR and that is configured in an SR configuration mapped to/associated with the first logical channel.

Figure 10:
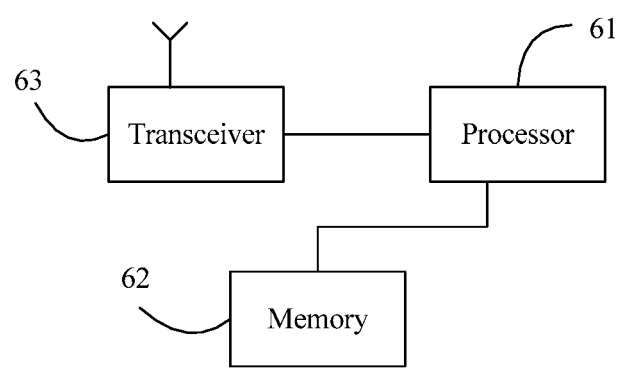
FIG. 10 is a schematic diagram of user equipment according to an embodiment of the present disclosure.

An embodiment of the present disclosure provides user equipment. Referring to FIG. 10, the user equipment includes a processor 61, and a memory 62 and a transceiver 63 that communicate with and are connected to the processor 61. The memory 62 is configured to store a computer instruction. The transceiver 63 is configured to communicate with a network device. The processor 61 is configured to execute the computer instruction, to perform, by using the transceiver 63 when executing the computer instruction, steps performed by the UE in the foregoing SR configuration method, and/or perform the SR sending method corresponding to any one of FIG. 5 to FIG. 9.

For an implementation of the user equipment, refer to the steps performed by the UE in the foregoing SR configuration method, and the SR sending method corresponding to any one of FIG. 5 to FIG. 9.

An embodiment of the present disclosure provides a network device, including a processor, and a memory and a transceiver that communicate with and are connected to the processor. The memory is configured to store a computer instruction. The transceiver is configured to communicate with a network device. The processor is configured to execute the computer instruction, to perform, by using the transceiver when executing the computer instruction, steps performed by the network device in the foregoing SR configuration method. For a structure of the network device, refer to FIG. 10.

For an implementation of the user equipment, refer to the steps performed by the network device in the foregoing SR configuration method.

It should be noted that the processor in the user equipment and the network device may be a processing component, or may be a general term of a plurality of processing components. For example, the processor may be a central processing unit (CPU) or an application-specific integrated circuit (ASIC), or may be configured as one or more integrated circuits implementing the embodiments of the present disclosure, for example, one or more microprocessors (DSP) or one or more field programmable gate arrays (FPGA).

The memory in the user equipment and the network device may be a storage component, or may be a general term of a plurality of storage components. The memory may include a random-access memory (RAM), or may include a non-volatile memory (NVM), such as a magnetic disk memory, a flash, or a cache.

An embodiment of the present disclosure further provides a computing device readable storage medium, and the readable storage medium stores a computer instruction. When the instruction is run on a computing device, the computing device is enabled to perform steps performed by the user equipment in the foregoing SR configuration method.

An embodiment of the present disclosure further provides a computing device readable storage medium, and the readable storage medium stores a computer instruction. When the instruction is run on a computing device, the computing device is enabled to perform steps performed by the user equipment in the foregoing SR sending method.

An embodiment of the present disclosure further provides a computing device readable storage medium, and the readable storage medium stores a computer instruction. When the instruction is run on a computing device, the computing device is enabled to perform steps performed by the network device in the foregoing SR configuration method.

An embodiment of the present disclosure further provides a computing device program product including an instruction. When the computing device program product runs on a computing device, the computing device is enabled to perform the foregoing SR configuration method.

An embodiment of the present disclosure further provides a computing device program product including an instruction. When the computing device program product runs on a computing device, the computing device is enabled to perform the SR sending method corresponding to any one of FIG. 5 to FIG. 9.

An embodiment of the present disclosure further provides a chip, including a processor and a memory. The memory is configured to store a computer program, and the processor is configured to invoke and run the computer program from the memory. The computer program is used to: implement steps performed by the UE in the foregoing SR configuration method, and/or perform the SR sending method corresponding to any one of FIG. 5 to FIG. 9. An embodiment of the present disclosure further provides a chip, including a processor and a memory. The memory is configured to store a computer program, and the processor is configured to invoke and run the computer program from the memory. The computer program is used to implement the foregoing SR configuration method.

This application is described with reference to the flowcharts and/or the block diagrams of the method, the device (system), and the computer program product according to this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The foregoing descriptions are only specific example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A scheduling request (SR) configuration method, the method comprising:
receiving, by a user equipment (UE), control signaling from a network device, wherein the control signaling is used to configure, for the UE, a configuration of a first logical channel, an SR configuration associated with the first logical channel, and at least two SR resource configurations associated with the SR configuration, wherein the configuration of the first logical channel comprises an identifier of the SR configuration, each SR resource configuration of the at least two SR resource configurations comprises the identifier of the SR configuration, and the at least two SR resource configurations indicate physical resources used to signal an SR associated with the first logical channel; and
signaling, by the UE, an SR associated with the first logical channel based on a physical resource indicated by one of the at least two SR resource configurations.

2. The method according to claim 1, wherein the configuration of the first logical channel comprises a logical channel identifier.

3. The method according to claim 1, wherein the at least two SR resource configurations are respectively configured on different bandwidth parts (BWPs), and a first SR resource configuration of the at least two SR resource configurations indicates a physical resource for signaling an SR on a first BWP on which the first SR resource configuration is configured, and a second SR resource configuration of the at least two SR resource configurations indicates a physical resource for transmitting an SR on a second BWP on which the second SR resource configuration is configured.

4. The method according to claim 3,
wherein the different BWPs belong to a same serving cell.

5. The method according to claim 1,
wherein the SR associated with the first logical channel is an SR triggered by a regular buffer status report (BSR); and
wherein the BSR is triggered due to new data reaching the first logical channel.

6. The method according to claim 1,
wherein the SR associated with the first logical channel is an SR triggered by a regular buffer status report (BSR);
wherein the BSR is triggered by a BSR retransmission timer expiring; and
wherein the first logical channel is a logical channel with a highest priority among logical channels having available transmission data or among logical channels having available transmission data and belonging to one logical channel group.

7. An electronic device, comprising:
at least one processor; and
at least one memory, the at least one memory comprising instructions that, when executed by the at least one processor, cause the electronic device to:
receive control signaling from a network device, wherein the control signaling is used to configure, for the electronic device, a configuration of a first logical channel, a scheduling request (SR) configuration associated with the first logical channel, and at least two SR resource configurations associated with the SR configuration, wherein the configuration of the first logical channel comprises an identifier of the SR configuration, each SR resource configuration of the at least two SR resource configurations comprises the identifier of the SR configuration, and the at least two SR resource configurations indicate physical resources used to signal an SR associated with the first logical channel; and
signal an SR associated with the first logical channel based on a physical resource indicated by one of the at least two SR resource configurations.

8. The electronic device according to claim 7, wherein the configuration of the first logical channel comprises a logical channel identifier.

9. The electronic device according to claim 7, wherein the at least two SR resource configurations are respectively configured on different bandwidth parts (BWPs), and a first SR resource configuration of the at least two SR resource configurations indicates a physical resource for signaling an SR on a first BWP on which the first SR resource configuration is configured, and a second SR resource configuration of the at least two SR resource configurations indicates a physical resource for transmitting an SR on a second BWP on which the second SR resource configuration is configured.

10. The electronic device according to claim 9,
wherein the different BWPs belong to a same serving cell.

11. The electronic device according to claim 7,
wherein the SR associated with the first logical is an SR triggered by a regular buffer status report (BSR); and
wherein the BSR is triggered due to new data reaching the first logical channel.

12. The electronic device according to claim 7,
wherein the SR associated with the first logical is an SR triggered by a regular buffer status report (BSR);
wherein the BSR is triggered by a BSR retransmission timer expiring; and
wherein the first logical channel is a logical channel with a highest priority among logical channels having available transmission data or among logical channels having available transmission data and belonging to one logical channel group.

13. A non-transitory computer-readable medium storing executable instructions that, when executed by a processor, cause an electronic device to:
receive control signaling sent by a network device, wherein the control signaling is used to configure, for the electronic device, a configuration of a first logical channel, a scheduling request (SR) configuration associated with the first logical channel, and at least two SR resource configurations associated with the SR configuration, wherein the configuration of the first logical channel comprises an identifier of the SR configuration, each SR resource configuration of the at least two SR resource configurations comprises the identifier of the SR configuration, and the at least two SR resource configurations indicate physical resources used to signal an SR associated with the first logical channel; and
signal an SR associated with the first logical channel, based on a physical resource indicated by one of the at least two SR resource configurations.

14. The computer-readable medium of claim 13, wherein the configuration of the first logical channel comprises a logical channel identifier.

15. The computer-readable medium of claim 13, wherein the at least two SR resource configurations are respectively configured on different bandwidth parts (BWPs), and a first SR resource configuration of the at least two SR resource configurations indicates a physical resource for signaling an SR on a first BWP on which the first SR resource configuration is configured, and a second SR resource configuration of the at least two SR resource configurations indicates a physical resource for transmitting an SR on a second BWP on which the second SR resource configuration is configured.

16. The computer-readable medium of claim 15, wherein the different BWPs belong to a same serving cell.

17. The computer-readable medium of claim 13,
wherein the SR associated with the first logical channel is an SR triggered by a regular buffer status report (BSR); and
wherein the BSR is triggered due to new data reaching the first logical channel.

18. The computer-readable medium of claim 13,
wherein the SR associated with the first logical channel is an SR triggered by a regular buffer status report (BSR);
wherein the BSR is triggered by a BSR retransmission timer expiring; and
wherein the first logical channel is a logical channel with a highest priority among logical channels having available transmission data or among logical channels having available transmission data and belonging to one logical channel group.

19. The method according to claim 3, wherein the first SR resource configuration of the at least two SR resource configurations is configured on the first BWP of a first serving cell, and the second SR resource configuration of the at least two SR resource configurations is configured on the second BWP of a second serving cell.

20. The electronic device according to claim 9, wherein the first SR resource configuration of the at least two SR resource configurations is configured on the first BWP of a first serving cell, and the second SR resource configuration of the at least two SR resource configurations is configured on the second BWP of a second serving cell.

21. The computer-readable medium of claim 15, wherein the first SR resource configuration of the at least two SR resource configurations is configured on the first BWP of a first serving cell, and the second SR resource configuration of the at least two SR resource configurations is configured on the second BWP of a second serving cell.

22. The method according to claim 1, wherein the SR is used for requesting an uplink resource for the first logical channel.

23. The method according to claim 1, wherein the SR configuration comprises at least one of an SR-prohibit timer duration and a maximum quantity of SR transmission times.

24. The method according to claim 23, wherein the SR configuration comprises a maximum quantity of SR transmission times, and the method further comprises:
setting, by the UE, a variable for recording a quantity of SR transmission times for the SR configuration;
adding, by the UE, one to a value of the variable after transmitting an SR on a physical resource indicated by any one of the at least two SR resource configurations; and
after the value of the variable reaches the maximum quantity of SR transmission times, releasing, by the UE, the physical resources indicated by the at least two SR resource configurations.

25. The method according to claim 23, wherein the SR configuration comprises the SR-prohibit timer duration, and the method further comprises:
setting, by the UE, an SR-prohibit timer for the SR configuration; and
starting, by the UE, the SR-prohibit timer after transmitting an SR on a physical resource indicated by any one of the at least two SR resource configurations, wherein the SR-prohibit timer is configured to prohibit, during a running period of the SR-prohibit timer, the UE from transmitting an SR on a physical resource indicated by any one of the at least two SR resource configurations, and a duration for which the SR-prohibit timer runs after being started each time is the SR-prohibit timer duration.

* * * * *